(12) United States Patent
Gao et al.

(10) Patent No.: US 11,971,522 B2
(45) Date of Patent: Apr. 30, 2024

(54) OPTICAL IMAGING LENS ASSEMBLY INCLUDING SIX LENSES OF +−++−−, +−+−+−, +−−+−−, +−+++−, or +−++−+ REFRACTIVE POWERS

(71) Applicant: Zhejiang Sunny Optical Co., Ltd, Zhejiang Province (CN)

(72) Inventors: Xue Gao, Zhejiang Province (CN); Ming Li, Zhejiang Province (CN); Jianke Wenren, Zhejiang Province (CN)

(73) Assignee: Zhejiang Sunny Optical Co., Ltd, Zhejiang Province (CN)

( * ) Notice: Subject to any disclaimer, the term of this patent is extended or adjusted under 35 U.S.C. 154(b) by 711 days.

(21) Appl. No.: 16/940,567

(22) Filed: Jul. 28, 2020

(65) Prior Publication Data

US 2020/0355893 A1    Nov. 12, 2020

Related U.S. Application Data

(63) Continuation of application No. PCT/CN2019/077466, filed on Mar. 8, 2019.

(30) Foreign Application Priority Data

May 2, 2018    (CN) .......................... 201810411178.3

(51) Int. Cl.
*G02B 13/00*    (2006.01)
*G02B 9/62*     (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS 9,588,318 B2    3/2017  Chen et al.
9,645,358 B2    5/2017  Liu et al.
(Continued)

FOREIGN PATENT DOCUMENTS

CN    103576296 A    2/2014
CN    105807407 A    7/2016
(Continued)

OTHER PUBLICATIONS

Translation of Indian Examination Report dated Dec. 14, 2021, in connection with India Patent Application No. 202017031629.
(Continued)

*Primary Examiner* — Wen Huang
(74) *Attorney, Agent, or Firm* — Norris McLaughlin, P.A.

(57) ABSTRACT

The present disclosure discloses an optical imaging lens assembly which includes sequentially from an object side to an image side along an optical axis, a first lens, a second lens, a third lens, a fourth lens, a fifth lens and a sixth lens. The first lens has a positive refractive power with a convex object-side surface; the second lens has a refractive power with a concave image-side surface; the third lens has a refractive power with a convex object-side surface; the fourth lens has a refractive power with a concave object-side surface; the fifth lens has a refractive power; and the sixth lens has a refractive power with a concave object-side surface. A maximum effective radius DT11 of the object-side surface of the first lens and a maximum effective radius DT61 of the object-side surface of the sixth lens satisfy $0.6<DT11/DT61<1$.

17 Claims, 14 Drawing Sheets

(56) References Cited

U.S. PATENT DOCUMENTS

| | | | |
|---|---|---|---|
| 9,791,668 B2 | 10/2017 | Dai et al. | |
| 10,025,069 B2 | 7/2018 | Jhang et al. | |
| 11,493,731 B2 | 11/2022 | Zhang et al. | |
| 2015/0205071 A1 | 7/2015 | Hashimoto | |
| 2015/0316750 A1 | 11/2015 | Dai et al. | |
| 2016/0170183 A1 | 6/2016 | Sekine | |
| 2016/0223797 A1* | 8/2016 | Zhao | G02B 13/0045 |
| 2016/0341931 A1 | 11/2016 | Liu et al. | |
| 2017/0307849 A1* | 10/2017 | Jhang | G02B 13/0045 |
| 2017/0307850 A1 | 10/2017 | Jhang et al. | |
| 2018/0031808 A1* | 2/2018 | Yao | G02B 9/62 |
| 2018/0052304 A1* | 2/2018 | Wu | G02B 13/0045 |
| 2018/0180851 A1* | 6/2018 | Son | G02B 13/0045 |
| 2018/0188484 A1* | 7/2018 | Gong | G02B 9/64 |
| 2019/0094497 A1* | 3/2019 | Huang | G02B 9/62 |
| 2020/0057249 A1 | 2/2020 | Zhang et al. | |

FOREIGN PATENT DOCUMENTS

| | | |
|---|---|---|
| CN | 106154495 A | 11/2016 |
| CN | 106168701 A | 11/2016 |
| CN | 106990511 A | 7/2017 |
| CN | 206450894 U | 8/2017 |
| CN | 107367827 A | 11/2017 |
| CN | 206757166 U | 12/2017 |
| CN | 107621682 A | 1/2018 |
| CN | 107783261 A | 3/2018 |
| CN | 107843977 A | 3/2018 |
| CN | 108287403 A | 7/2018 |
| JP | 2015060201 A | 3/2015 |

OTHER PUBLICATIONS

International Search Report dated Apr. 18, 2019, in connection with PCT International Application No. PCT/CN2019/077466.

English translation of International Search Report dated Apr. 18, 2019, in connection with PCT International Application No. PCT/CN2019/077466.

Written Opinion dated May 29, 2019, in connection with PCT International Application No. PCT/CN2019/077466.

* cited by examiner

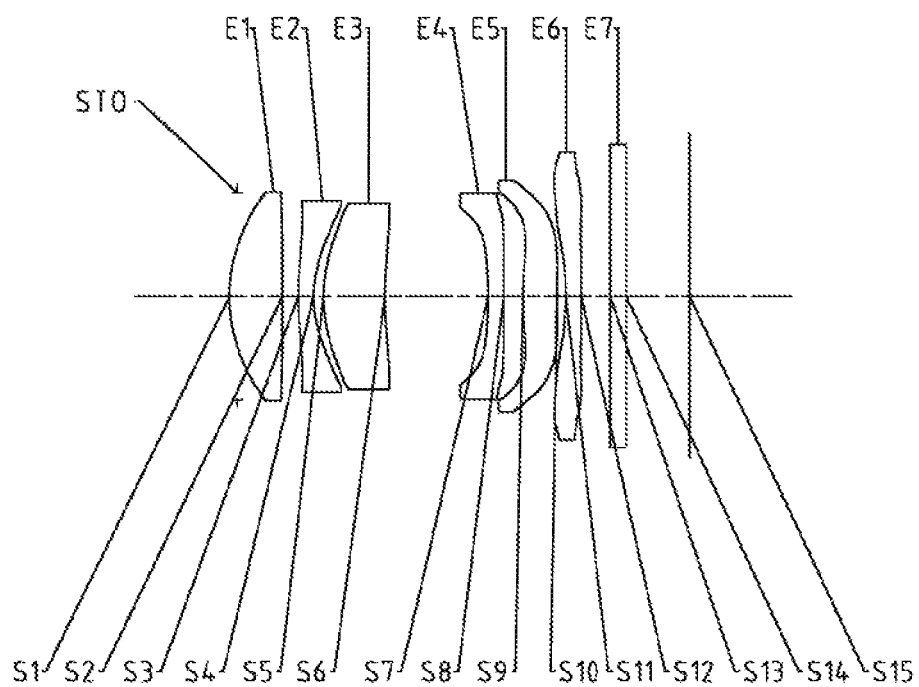
Fig. 17
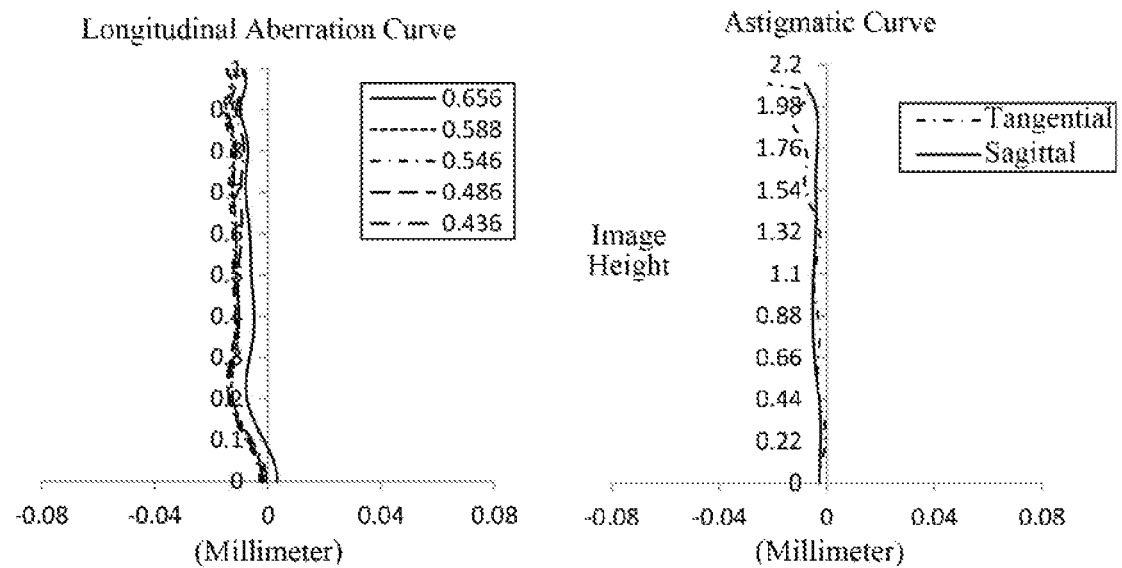
Fig. 18A
Fig. 18B

OPTICAL IMAGING LENS ASSEMBLY INCLUDING SIX LENSES OF +−++−−, +−+−+−, +−−+−−, +−+++−, or +−++−+ REFRACTIVE POWERS

CROSS-REFERENCE TO RELATED APPLICATION

The present patent application is a continuation of International Application No. PCT/CN2019/077466, filed on Mar. 8, 2019, which claims the priority from Chinese Patent Application No. 201810411178.3, filed before the China National Intellectual Property Administration (CNIPA) on May 2, 2018. Both of the aforementioned patent applications are hereby incorporated by reference in their entireties.

TECHNICAL FIELD

The present disclosure relates to an optical imaging lens assembly, and specifically to an optical imaging lens assembly including six lenses.

BACKGROUND

With the rapid replacement of consumer electronic products, such as smart phones, portable computers and tablet devices, the market is increasingly demanding the quality of optical imaging lens assemblies for electronic products. The optical imaging lens assemblies are not only required to have basic performance, such as high resolution and high relative brightness, but also required to have long-focus characteristics. However, for the existing long-focus lens assembly, high imaging quality is usually achieved by increasing the number of lenses, but the size of the long-focus lens assembly will be larger, which cannot meet the requirements of ultra-thin and miniaturization of current electronic devices while satisfying the long-focus characteristics and high imaging quality.

SUMMARY

The present disclosure provides an optical imaging lens assembly which is applicable to portable electronic products and may at least solve or partially solve at least one of the technical problems mentioned above in the prior art.

The present disclosure provides an optical imaging lens assembly including, sequentially from an object side to an image side along an optical axis, a first lens, a second lens, a third lens, a fourth lens, a fifth lens and a sixth lens. The first lens may have a positive refractive power, of which an object-side surface may be a convex surface; the second lens has a positive or negative refractive power, of which an image-side surface may be a concave surface; the third lens has a positive or negative refractive power, of which an object-side surface may be a convex surface; the fourth lens has a positive or negative refractive power, of which an object-side surface may be a concave surface; the fifth lens has a positive or negative refractive power; and the sixth lens has a positive or negative refractive power, of which an object-side surface may be a concave surface.

In one implementation, a maximum effective radius DT11 of the object-side surface of the first lens and a maximum effective radius DT61 of the object-side surface of the sixth lens may satisfy $0.6<DT11/DT61<1$.

In one implementation, a total effective focal length f of the optical imaging lens assembly and half of a maximal field-of-view angle HFOV of the optical imaging lens assembly may satisfy $1.6<f*TAN(HFOV)<2.4$.

In one implementation, a total effective focal length f of the optical imaging lens assembly, an effective focal length f1 of the first lens and half of a maximal field-of-view angle HFOV of the optical imaging lens assembly may satisfy $4.5 \leq f/f1/TAN(HFOV)<6.5$.

In one implementation, a total effective focal length f of the optical imaging lens assembly and a distance TTL along the optical axis from the object-side surface of the first lens to an imaging plane of the optical imaging lens assembly may satisfy $TTL/f<1.05$.

In one implementation, an effective focal length f1 of the first lens and the total focal length f of the optical imaging lens assembly may satisfy $0.5<f1/f<1$.

In one implementation, the total focal length f of the optical imaging lens assembly, a radius of curvature R7 of the object-side surface of the fourth lens and a radius of curvature R8 of an image-side surface of the fourth lens may satisfy $|f/R7-f/R8|<2.5$.

In one implementation, an effective focal length f1 of the first lens and a sum $\Sigma CT$ of center thicknesses along the optical axis of the first lens to the sixth lens may satisfy $1<f1/\Sigma CT<2$.

In one implementation, a center thickness CT2 along the optical axis of the second lens, a center thickness CT3 along the optical axis of the third lens and a center thickness CT4 along the optical axis of the fourth lens may satisfy $(CT2+CT4)/CT3<1$.

In one implementation, a center thickness CT1 along the optical axis of the first lens, a spaced interval T45 along the optical axis between the fourth lens and the fifth lens, a center thickness CT5 along the optical axis of the fifth lens, a spaced interval T56 along the optical axis between the fifth lens and the sixth lens, and a center distance CT6 along the optical axis of the sixth lens may satisfy $0.5<CT1/(T45+CT5+T56+CT6)<1.5$.

In one implementation, a spaced interval T23 along the optical axis between the second lens and the third lens, a spaced interval T34 along the optical axis between the third lens and the fourth lens, a spaced interval T45 along the optical axis between the fourth lens and the fifth lens may satisfy $(T23+T45)/T34<0.4$.

In one implementation, a combined focal length f123 of the first lens, the second lens and the third lens, and a combined focal length f456 of the fourth lens, the fifth lens and the sixth lens may satisfy $|f123/f456|<1$.

In one implementation, a distance SAG41 along the optical axis from an intersection of the object-side surface of the fourth lens and the optical axis to a vertex of an effective radius of the object-side surface of the fourth lens and a spaced interval T34 along the optical axis between the third lens and the fourth lens may satisfy $|SAG41/T34|<0.5$.

In one implementation, a radius of curvature R1 of the object-side surface of the first lens, a radius of curvature R4 of the image-side surface of the second lens, a radius of curvature R5 of the object-side surface of the third lens and a radius of curvature R11 of the object-side surface of the sixth lens may satisfy $-1.5<(R5+R11)/(R1+R4)<0.5$.

In one implementation, an effective focal length f2 of the second lens, an effective focal length f3 of the third lens and an effective focal length f6 of the sixth lens may satisfy $-1<(1/f3+1/f6)*f2<1.5$.

The present disclosure employs six lenses, and the optical imaging lens assembly described above has at least one advantageous effect, such as long-focus characteristics, miniaturization, high image quality, low sensitivity, and the like, by properly disposing the refractive power, the surface shape, the center thickness of each lens and the spaced interval along the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 17 is a schematic structural view of an optical imaging lens assembly according to embodiment 9 of the present disclosure; and FIGS. 18A-18D illustrate a longitudinal aberration curve, an astigmatic curve, a distortion curve and a lateral color curve of the optical imaging lens assembly according to embodiment 9, respectively.

DETAILED DESCRIPTION OF EMBODIMENTS

Figure 1:
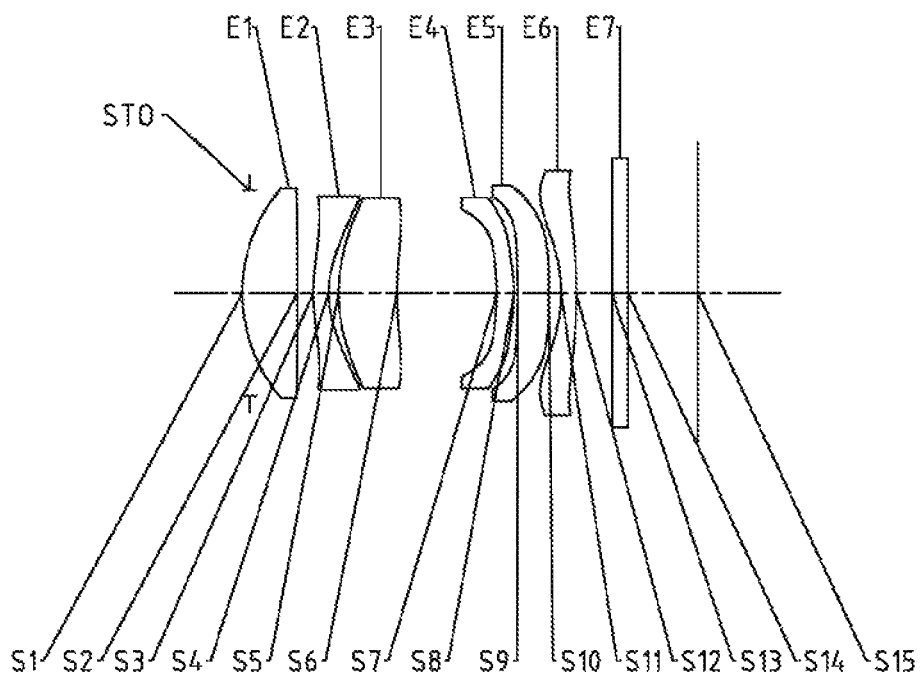
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments. The features, principles, and other aspects of the present disclosure are described in detail below.

An optical imaging lens assembly according to exemplary implementations of the present disclosure may include, for example, six lenses, i.e., a first lens, a second lens, a third lens, a fourth lens, a fifth lens and sixth lens, each of which has refractive power. These six lenses are sequentially arranged from an object side to an image side along an optical axis, and there is an air gap existed between each adjacent lens.

In an exemplary implementation, the first lens may have a positive refractive power, of which an object-side surface may be a convex surface; the second lens has a positive or negative refractive power, of which an image-side surface may be a concave surface; the third lens has a positive or negative refractive power, of which an object-side surface may be a convex surface; the fourth lens has a positive or negative refractive power, of which an object-side surface may be a concave surface; the fifth lens has a positive or negative refractive power; and the sixth lens has a positive or negative refractive power, of which an object-side surface may be a concave surface.

In an exemplary implementation, the second lens may have a negative refractive power In an exemplary implementation, an image-side surface of the third lens may be a concave surface.

In an exemplary implementation, an image-side surface of the fourth lens may be a convex surface.

In an exemplary implementation, the optical imaging lens assembly of the present disclosure may satisfy a conditional expression $1.6<f*TAN(HFOV)<2.4$, wherein f is a total effective focal length of the optical imaging lens assembly, and HFOV is half of a maximal field-of-view angle of the optical imaging lens assembly. More specifically, f and HFOV may further satisfy $1.80<f*TAN(HFOV)<2.10$, for example, $1.86 \leq f*TAN(HFOV) \leq 2.08$. By properly controlling the total effective focal length and maximal field-of-view angle of the optical imaging system, the optical refractive powers can be effectively and properly arranged, and chromatic aberration can be effectively corrected.

In an exemplary implementation, the optical imaging lens assembly of the present disclosure may satisfy a conditional expression $0.6<DT11/DT61<1$, wherein DT11 is a maximum effective radius of the object-side surface of the first lens, and DT61 is a maximum effective radius of the object-side surface of the sixth lens. More specifically, DT11 and DT61 may further satisfy $0.70<DT11/DT61<0.90$, for example, $0.74 \leq DT11/DT61 \leq 0.87$. By properly controlling the ratio of DT11 to DT61, the miniaturization of the optical system can be effectively maintained, and the utility of the optical system can be improved.

In an exemplary implementation, the optical imaging lens assembly of the present disclosure may satisfy a conditional expression $TTL/f<1.05$, wherein TTL is a distance along the optical axis from the object-side surface of the first lens to an imaging plane of the optical imaging lens assembly, and f is a total effective focal length of the optical imaging lens assembly. More specifically, TTL and f may further satisfy $0.95<TTL/f<1.00$, for example, $0.97 \leq TTL/f \leq 0.99$. By properly controlling the ratio of TTL to f, the imaging lens assembly may have long-focus characteristics while maintaining ultra-thin characteristics.

In an exemplary implementation, the optical imaging lens assembly of the present disclosure may satisfy a conditional expression $0.5<f1/f<1$, wherein f1 is an effective focal length of the first lens, and f is the total focal length of the optical imaging lens assembly. More specifically, f1 and f may further satisfy $0.50<f1/f<0.70$, for example, $0.52 \leq f1/f \leq 0.65$. By properly controlling the ratio of f1 to f, the spherical aberration, coma, astigmatic and distortion of the system can be effectively offset.

In an exemplary implementation, the optical imaging lens assembly of the present disclosure may satisfy a conditional expression $|SAG41/T34|<0.5$, wherein SAG41 is a distance along the optical axis from an intersection of the object-side surface of the fourth lens and the optical axis to a vertex of an effective radius of the object-side surface of the fourth lens, and T34 is a spaced interval along the optical axis between the third lens and the fourth lens. More specifically, SAG41 and T34 may further satisfy $0.20<|SAG41/T34|<0.40$, for example, $0.28 \leq |SAG41/T34| \leq 0.36$. Properly controlling the ratio of SAG41 to T34 can effectively control the deflection of light and reduce the sensitivity of the system while reducing the size of the front end of the system.

In an exemplary implementation, the optical imaging lens assembly of the present disclosure may satisfy a conditional expression $-1.5<(R5+R11)/(R1+R4)<0.5$, wherein R1 is a radius of curvature of the object-side surface of the first lens, R4 is a radius of curvature of the image-side surface of the second lens, R5 is a radius of curvature of the object-side surface of the third lens, and R11 is a radius of curvature of the object-side surface of the sixth lens. More specifically, R1, R4, R5 and R11 may further satisfy $-1.30<(R5+R11)/(R1+R4)<0.30$, for example, $-1.28 \leq (R5+R11)/(R1+R4) \leq 0.24$. By properly disposing the ratio of the sum of R1 and R4 to the sum of R5 and R11, the astigmatic of the system can be effectively reduced.

In an exemplary implementation, the optical imaging lens assembly of the present disclosure may satisfy a conditional expression $-1<(1/f3+1/f6)*f2<1.5$, wherein f2 is an effective focal length of the second lens, f3 is an effective focal length of the third lens, and f6 is an effective focal length of the sixth lens. More specifically, f2, f3 and f6 may further satisfy $-0.70<(1/f3+1/f6)*f2<1.10$, for example, $-0.64 \leq (1/f3+1/f6)*f2 \leq 1.06$. By properly controlling the effective focal lengths of the second lens, the third lens, and the sixth lens, the distortion of the system can be effectively offset.

In an exemplary implementation, the optical imaging lens assembly of the present disclosure may satisfy a conditional expression $(CT2+CT4)/CT3<1$, wherein CT2 is a center thickness along the optical axis of the second lens, CT3 is a center thickness along the optical axis of the third lens and CT4 is a center thickness along the optical axis of the fourth lens. More specifically, CT2, CT3 and CT4 may further satisfy $0.40<(CT2+CT4)/CT3<0.70$, for example, $0.44 \leq (CT2+CT4)/CT3 \leq 0.63$. By properly controlling the ratio of the sum of CT2 and CT4 to CT3, the coma and spherical aberration of the system can be effectively reduced.

In an exemplary implementation, the optical imaging lens assembly of the present disclosure may satisfy a conditional expression $|f/R7-f/R8|<2.5$, wherein f is a total focal length of the optical imaging lens assembly, R7 is a radius of curvature of the object-side surface of the fourth lens and R8 is a radius of curvature of an image-side surface of the fourth lens. More specifically, f, R7 and R8 may further satisfy $0.05 \leq |f/R7-f/R8| \leq 2.32$. By properly controlling the radii of curvature of the object-side surface and image-side surface of the fourth lens and the total effective focal length of the system, the astigmatic and distortion of the system can be effectively reduced.

In an exemplary implementation, the optical imaging lens assembly of the present disclosure may satisfy a conditional expression $|f123/f456|<1$, wherein f123 is a combined focal length of the first lens, the second lens and the third lens, and f456 is a combined focal length of the fourth lens, the fifth lens and the sixth lens. More specifically, f123 and f456 may further satisfy $0.10<|f123/f456|<0.70$, for example, $0.19\leq|f123/f456|\leq0.61$. By properly controlling the ratio of f123 to f456, the optical refractive powers can be effectively and properly arranged, and chromatic aberration of the system can be effectively corrected.

In an exemplary implementation, the optical imaging lens assembly of the present disclosure may satisfy a conditional expression $0.5<CT1/(T45+CT5+T56+CT6)<1.5$, wherein CT1 is a center thickness along the optical axis of the first lens, T45 is a spaced interval along the optical axis between the fourth lens and the fifth lens, CT5 is a center thickness along the optical axis of the fifth lens, T56 is a spaced interval along the optical axis between the fifth lens and the sixth lens, and CT6 is a center distance along the optical axis of the sixth lens. More specifically, CT1, T45, CT5, T56 and CT6 may further satisfy $0.60<CT1/(T45+CT5+T56+CT6)<1.30$, for example, $0.68\leq CT1/(T45+CT5+T56+CT6)\leq1.27$. By properly controlling CT1, T45, CT5, T56 and CT6, the tolerance sensitivity of the optical imaging system can be reduced while reducing the size of the rear end of the optical imaging system, thereby improving the imaging quality.

In an exemplary implementation, the optical imaging lens assembly of the present disclosure may satisfy a conditional expression $1<f1/\Sigma CT<2$, wherein f1 is an effective focal length of the first lens, and $\Sigma CT$ is sum of center thicknesses along the optical axis of the first lens to the sixth lens. More specifically, $\Sigma CT$ and f1 may further satisfy $1.24\leq f1/\Sigma CT\leq1.57$. Satisfying the conditional expression $1<f1/\Sigma CT<2$ is beneficial to ensure the miniaturization of the lens assembly. By properly controlling the distribution of the center thickness of each lens, the deflection of light may tend to ease, the system sensitivity may be reduced, and at the same time, the astigmatic, distortion and chromatic aberration of the system may be reduced.

In an exemplary implementation, the optical imaging lens assembly of the present disclosure may satisfy a conditional expression $(T23+T45)/T34<0.4$, wherein T23 is a spaced interval along the optical axis between the second lens and the third lens, T34 is a spaced interval along the optical axis between the third lens and the fourth lens, and T45 is a spaced interval along the optical axis between the fourth lens and the fifth lens. More specifically, T23, T34 and T45 may further satisfy $0<(T23+T45)/T34<0.30$, for example, $0.1\leq(T23+T45)/T34\leq0.28$. By properly controlling T23, T34 and T45, a good processing gap between the optical lenses can be ensured, and an appropriate deflection of light in the system can also be ensured.

In an exemplary implementation, the optical imaging lens assembly of the present disclosure may satisfy a conditional expression $4.5\leq f/f1/TAN(HFOV)<6.5$, wherein, f is a total effective focal length of the optical imaging lens assembly, f1 is an effective focal length of the first lens, and HFOV is half of a maximal field-of-view angle of the optical imaging lens assembly. More specifically, f, f1 and HFOV may further satisfy $4.55\leq f/f1/TAN(HFOV)\leq6.14$. By controlling the total effective focal length of the optical imaging lens assembly, the effective focal length of the first lens, and half of the maximal field-of-view angle of the optical imaging system, the chromatic aberration of the optical system can be effectively reduced, the deflection angle of light at the front end of the optical system can be reduced, and the sensitivity can be reduced.

In an exemplary implementation, the optical imaging lens assembly of the present disclosure may further include at least one stop to improve the imaging quality of the optical imaging lens assembly. The stop may be disposed between the object side and the first lens. Alternatively, the optical imaging lens assembly described above may further include an optical filter for correcting chromatic aberration and/or a protective glass for protecting a photosensitive element on the imaging plane.

The optical imaging lens assembly according to the above implementations of the present disclosure may employ a plurality of lenses, such as six lenses as described above. By properly disposing the refractive power, the surface shape, the center thickness of each lens, and spaced distances along the optical axis between the lenses, the size and the sensitivity of the optical imaging lens assembly can be effectively reduced, and the processability of the optical imaging lens assembly can be improved, such that the optical imaging lens assembly is more beneficial for production processing and can be applied to portable electronic products. The optical imaging lens assembly configured as above also has advantageous effect such as long-focus, high resolution, high relative brightness and excellent imaging quality, etc.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. By using an aspheric lens, the aberrations that occur during imaging can be eliminated as much as possible, and thus improving imaging quality.

However, it will be understood by those skilled in the art that the number of lenses constituting the optical imaging lens assembly can be varied to achieve the various results and advantages described in this specification without departing from the technical solution claimed by the present disclosure. For example, although the implementation are described by taking six lenses as an example, the optical imaging lens assembly is not limited to including six lenses. The optical imaging lens assembly may also include other numbers of lenses if desired. Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of the optical imaging lens assembly according to embodiment 1 of the present disclosure.

As shown in FIG. 1, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a negative refractive power, an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 1 shows surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.1000 | | | |
| S1 | aspheric | 2.1062 | 0.7235 | 1.53 | 56.0 | 0.4710 |
| S2 | aspheric | −1171.8634 | 0.2133 | | | −99.0000 |
| S3 | aspheric | 2.6841 | 0.2000 | 1.61 | 26.6 | −19.6446 |
| S4 | aspheric | 1.2682 | 0.1316 | | | −3.9870 |
| S5 | aspheric | 2.1755 | 0.7697 | 1.53 | 56.0 | −2.3129 |
| S6 | aspheric | 4.8852 | 1.3133 | | | −52.4168 |
| S7 | aspheric | −3.1570 | 0.2269 | 1.53 | 56.0 | 5.8436 |
| S8 | aspheric | −1.4944 | 0.0500 | | | −15.9801 |
| S9 | aspheric | −5.0756 | 0.4103 | 1.61 | 26.6 | 14.2325 |
| S10 | aspheric | 226.0494 | 0.1582 | | | 99.0000 |
| S11 | aspheric | −2.5295 | 0.2000 | 1.53 | 56.0 | −4.7275 |
| S12 | aspheric | −15.8143 | 0.4727 | | | −99.0000 |
| S13 | spherical | infinite | 0.2100 | 1.52 | 64.2 | |
| S14 | spherical | infinite | 0.9206 | | | |
| S15 | spherical | infinite | | | | |

As can be seen from Table 1, the object-side surface and the image-side surface of any one of the first lens E1 to the sixth lens E6 are aspheric. In this embodiment, the surface shape x of each aspheric lens can be defined by using, but not limited to, the following aspheric formula:

$$x = \frac{ch^2}{1 + \sqrt{1 - (k+1)c^2h^2}} + \sum A_i h^i \quad (1)$$

Here, x is the sag—the axis-component of the displacement of the aspheric surface from the aspheric vertex, when the surface is at height h from the optical axis; c is the paraxial curvature of the aspheric surface, c=1/R (that is, the paraxial curvature c is reciprocal of the radius of curvature R in the above Table 1); k is the conic coefficient (given in the above Table 1); Ai is a correction coefficient for the i-th order of the aspheric surface. Table 2 below shows high-order coefficients $A_4$, $A_6$, $A_8$, $A_{10}$, $A_{12}$, $A_{16}$, $A_{18}$ and $A_{20}$ applicable to each aspheric surface S1-S12 in embodiment 1.

TABLE 2

| Surface number | A4 | A6 | A8 | A10 | A12 |
|---|---|---|---|---|---|
| S1 | −1.7205E−03 | −4.7566E−02 | 1.3985E−01 | −2.4609E−01 | 2.5964E−01 |
| S2 | −8.3283E−03 | 2.3740E−02 | −2.1831E−02 | −5.9105E−02 | 1.6434E−01 |
| S3 | −9.3808E−02 | 2.6467E−01 | −7.6005E−01 | 1.2383E+00 | −1.1873E+00 |
| S4 | −8.1530E−02 | 6.1018E−01 | −2.0904E+00 | 4.1122E+00 | −5.0163E+00 |
| S5 | −4.2601E−02 | 2.7733E−01 | −8.6266E−01 | 1.5412E+00 | −1.7007E+00 |

TABLE 2-continued

| | | | | | |
|---|---|---|---|---|---|
| S6 | 5.7773E−03 | −3.0013E−02 | −5.5318E−02 | 1.8122E−01 | −2.7366E−01 |
| S7 | 1.2398E−01 | 1.1246E−01 | −1.5924E+00 | 3.9443E+00 | −6.5142E+00 |
| S8 | 2.8608E−01 | −1.8114E−01 | −8.6469E−01 | 1.8411E+00 | −2.4494E+00 |
| S9 | 4.3829E−01 | −1.3119E+00 | 2.9195E+00 | −5.3486E+00 | 6.4876E+00 |
| S10 | −2.8454E−01 | 3.1519E−01 | −1.2760E−01 | −4.0243E−01 | 7.3189E−01 |
| S11 | −2.8504E−01 | 3.9817E−01 | 9.8816E−02 | −7.8600E−01 | 9.2454E−01 |
| S12 | −1.6187E−01 | 2.7572E−01 | −2.1379E−01 | 7.2464E−02 | 5.7430E−04 |

| Surface number | A14 | A16 | A18 | A20 |
|---|---|---|---|---|
| S1 | −1.6735E−01 | 6.4381E−02 | −1.3581E−02 | 1.2117E−03 |
| S2 | −1.7199E−01 | 9.2404E−02 | −2.5305E−02 | 2.8034E−03 |
| S3 | 6.6286E−01 | −1.9940E−01 | 2.5195E−02 | −1.0682E−04 |
| S4 | 3.8478E+00 | −1.8087E+00 | 4.7816E−01 | −5.4739E−02 |
| S5 | 1.1721E+00 | −4.8838E−01 | 1.1206E−01 | −1.0840E−02 |
| S6 | 2.5470E−01 | −1.4556E−01 | 4.5663E−02 | −5.9208E−03 |
| S7 | 7.0526E+00 | −4.6611E+00 | 1.7046E+00 | −2.6369E−01 |
| S8 | 2.5994E+00 | −1.8308E+00 | 7.0650E−01 | −1.1222E−01 |
| S9 | −4.7833E+00 | 2.0421E+00 | −4.6019E−01 | 4.1877E−02 |
| S10 | −5.6606E−01 | 2.3574E−01 | −5.2097E−02 | 4.8616E−03 |
| S11 | −5.4274E−01 | 1.7718E−01 | −3.0785E−02 | 2.2273E−03 |
| S12 | −7.5409E−03 | 2.1435E−03 | −2.4594E−04 | 1.0195E−05 |

Table 3 shows effective focal lengths f1 to f6 of lenses, the total effective focal length f, a total optical length TTL (i.e., a distance along the optical axis from the center of the object-side surface S1 of the first lens E1 to the imaging plane S15), and half of a maximal field-of-view angle HFOV of the optical imaging lens assembly in embodiment 1.

TABLE 3

| f1 (mm) | 3.94 |
|---|---|
| f2 (mm) | −4.15 |
| f3 (mm) | 6.69 |
| f4 (mm) | 5.07 |
| f5 (mm) | −8.10 |
| f6 (mm) | −5.67 |
| f (mm) | 6.18 |
| TTL (mm) | 6.00 |
| HFOV (°) | 17.7 |

Figures 2A, 2B:
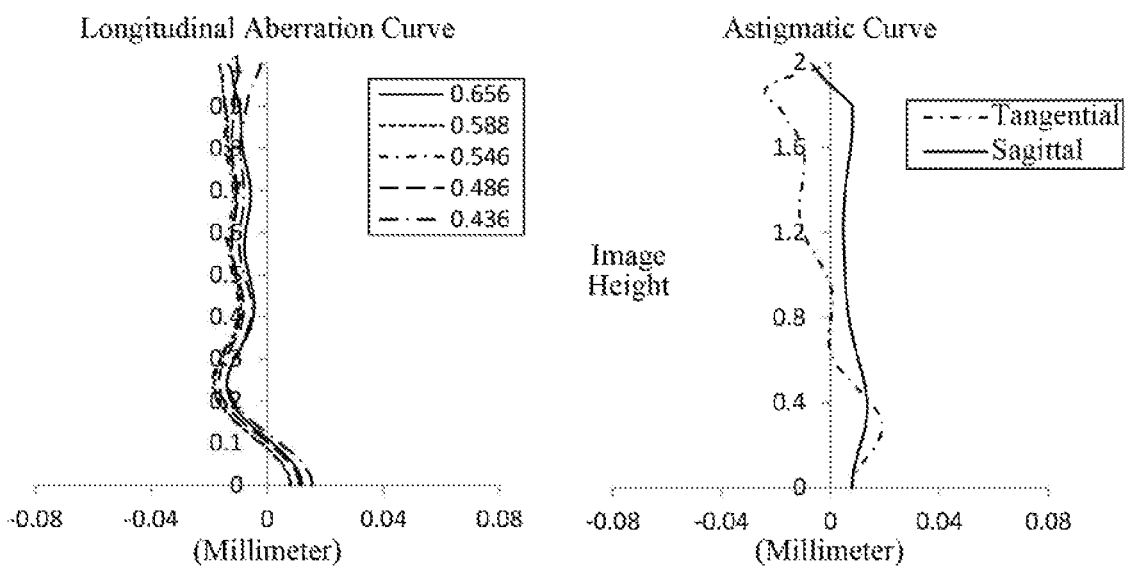
FIGS. 2A-2D illustrate a longitudinal aberration curve, an astigmatic curve, a distortion curve and a lateral color curve of the optical imaging lens assembly according to embodiment 1, respectively.
Figure 2C:
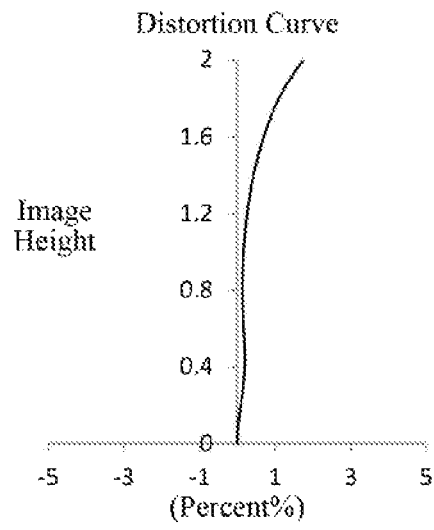
Figure 2D:
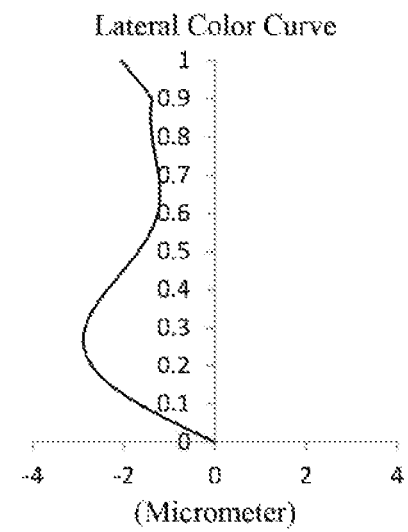

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion at different image heights. FIG. 2D illustrates a lateral color curve of the optical imaging lens assembly according to embodiment 1, representing deviations of different image heights on an imaging plane after light passes through the optical imaging lens assembly. It can be seen from FIG. 2A to FIG. 2D that the optical imaging lens assembly provided in embodiment 1 can achieve good image quality.

Embodiment 2

Figure 3:
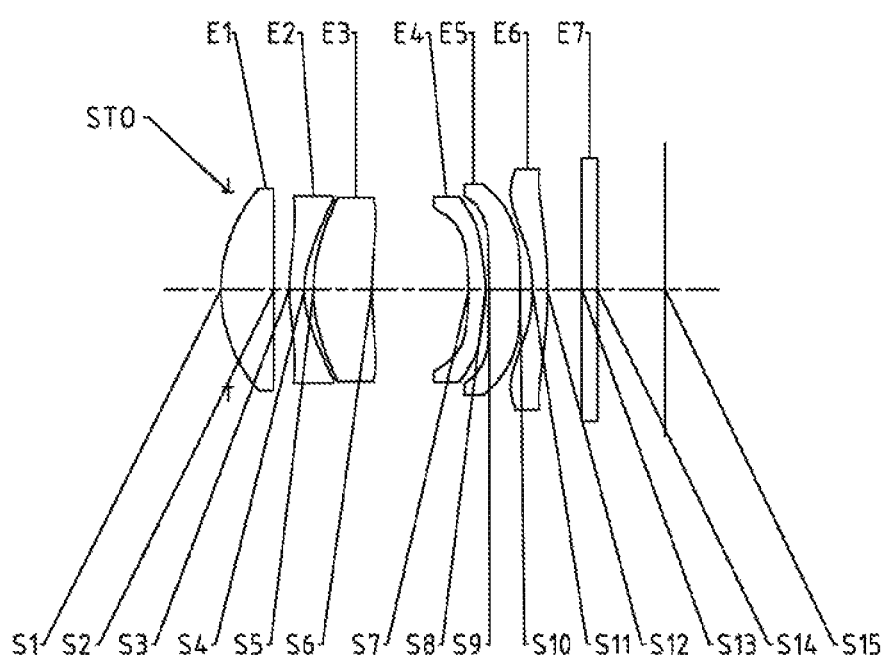
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a negative refractive power, an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 4 shows surface type, radius of curvature, thickness, material and conic coefficient of each lens of the optical imaging lens assembly in embodiment 2, wherein the units for the radius of curvature and the thickness are millimeter (mm). Table 5 shows high-order coefficients applicable to each aspheric surface in embodiment 2, wherein the surface type of each aspheric surface may be defined by the formula (1) given above in embodiment 1. Table 6 shows effective focal lengths f1 to f6 of lenses, the total effective focal length f, a total optical length TTL, and half of a maximal field-of-view angle HFOV of the optical imaging lens assembly in embodiment 2.

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.1000 | | | |
| S1 | aspheric | 2.1014 | 0.7158 | 1.53 | 56.0 | 0.4689 |
| S2 | aspheric | 251.2571 | 0.2098 | | | −99.0000 |
| S3 | aspheric | 2.8518 | 0.2000 | 1.61 | 26.6 | −19.6319 |
| S4 | aspheric | 1.3042 | 0.1250 | | | −3.9836 |
| S5 | aspheric | 2.1690 | 0.7894 | 1.53 | 56.0 | −2.3107 |
| S6 | aspheric | 5.0573 | 1.3067 | | | −51.5894 |
| S7 | aspheric | −3.1640 | 0.2267 | 1.53 | 56.0 | 5.8396 |
| S8 | aspheric | −1.4942 | 0.0522 | | | −15.6285 |
| S9 | aspheric | −5.0918 | 0.4189 | 1.61 | 26.6 | 14.3403 |
| S10 | aspheric | −1000.0000 | 0.1630 | | | 99.0000 |
| S11 | aspheric | −2.4150 | 0.2000 | 1.53 | 56.0 | −4.4190 |
| S12 | aspheric | −10.9553 | 0.4672 | | | −99.0000 |
| S13 | spherical | infinite | 0.2100 | 1.52 | 64.2 | |
| S14 | spherical | infinite | 0.9151 | | | |
| S15 | spherical | infinite | | | | |

TABLE 5

| Surface number | A4 | A6 | A8 | A10 | A12 |
|---|---|---|---|---|---|
| S1 | −5.4933E−03 | −2.6665E−02 | 7.4853E−02 | −1.2747E−01 | 1.2624E−01 |
| S2 | −6.9836E−03 | 1.4461E−02 | 6.1249E−03 | −1.0389E−01 | 2.0573E−01 |
| S3 | −9.4330E−02 | 2.3599E−01 | −6.2211E−01 | 9.4868E−01 | −8.3945E−01 |
| S4 | −6.8275E−02 | 5.0621E−01 | −1.7309E+00 | 3.4251E+00 | −4.2149E+00 |
| S5 | −3.3549E−02 | 2.2641E−01 | −7.3015E−01 | 1.3639E+00 | −1.5760E+00 |
| S6 | 4.8301E−03 | −3.7926E−02 | −9.4547E−03 | 8.0483E−02 | −1.4163E−01 |
| S7 | 1.1401E−01 | 1.0671E−01 | −1.4164E+00 | 3.0918E+00 | −4.4143E+00 |
| S8 | 2.6949E−01 | 6.0845E−02 | −1.9478E+00 | 4.2119E+00 | −5.4601E+00 |
| S9 | 4.3404E−01 | −1.0776E+00 | 1.9483E+00 | −3.2617E+00 | 3.7447E+00 |
| S10 | −3.0591E−01 | 4.2108E−01 | −3.8040E−01 | −1.6861E−02 | 3.4265E−01 |
| S11 | −2.9328E−01 | 4.6379E−01 | −1.1625E−01 | −4.2474E−01 | 5.8048E−01 |
| S12 | −1.3777E−01 | 2.4269E−01 | −2.0034E−01 | 8.3992E−02 | −1.7375E−02 |

| Surface number | A14 | A16 | A18 | A20 |
|---|---|---|---|---|
| S1 | −7.3498E−02 | 2.4037E−02 | −3.8869E−03 | 2.1536E−04 |
| S2 | −1.9443E−01 | 9.8895E−02 | −2.5964E−02 | 2.7585E−03 |
| S3 | 4.0518E−01 | −8.1800E−02 | −5.2275E−03 | 3.3002E−03 |
| S4 | 3.2523E+00 | −1.5295E+00 | 4.0233E−01 | −4.5649E−02 |
| S5 | 1.1304E+00 | −4.8596E−01 | 1.1415E−01 | −1.1237E−02 |
| S6 | 1.4460E−01 | −8.9219E−02 | 2.9731E−02 | −4.0302E−03 |
| S7 | 4.2430E+00 | −2.5593E+00 | 8.7069E−01 | −1.2650E−01 |
| S8 | 4.9483E+00 | −2.9501E+00 | 1.0073E+00 | −1.4729E−01 |
| S9 | −2.5416E+00 | 9.4323E−01 | −1.6624E−01 | 9.0052E−03 |
| S10 | −3.1042E−01 | 1.3247E−01 | −2.8989E−02 | 2.6719E−03 |
| S11 | −3.4940E−01 | 1.1350E−01 | −1.9388E−02 | 1.3707E−03 |
| S12 | 1.9578E−03 | −3.4503E−04 | 7.8705E−05 | −6.6536E−06 |

TABLE 6

| | |
|---|---|
| f1 (mm) | 3.97 |
| f2 (mm) | −4.13 |
| f3 (mm) | 6.50 |
| f4 (mm) | 5.06 |
| f5 (mm) | −8.35 |
| f6 (mm) | −5.85 |
| f (mm) | 6.08 |
| TTL (mm) | 6.00 |
| HFOV (°) | 18.0 |

Figure 4A:
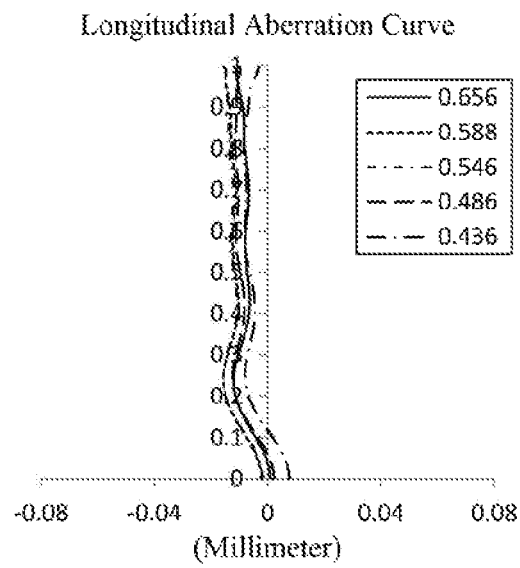
FIGS. 4A-4D illustrate a longitudinal aberration curve, an astigmatic curve, a distortion curve and a lateral color curve of the optical imaging lens assembly according to embodiment 2, respectively.
Figure 4B:
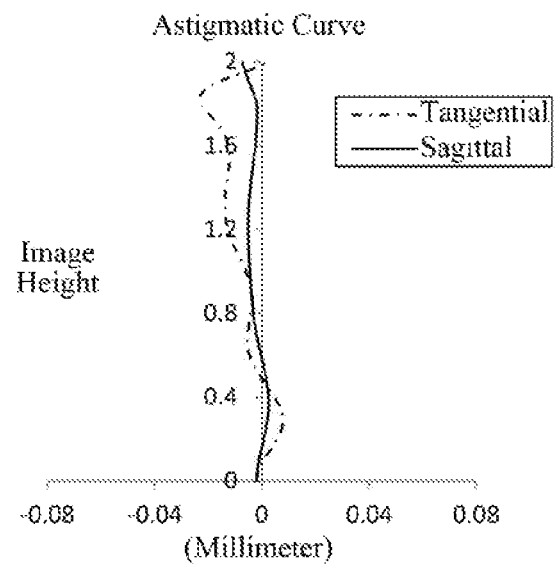
Figure 4C:
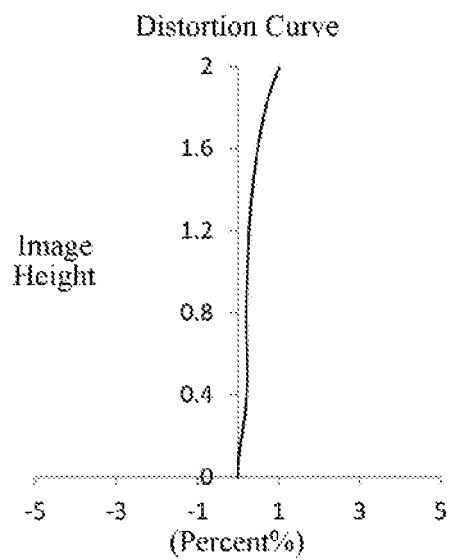
Figure 4D:
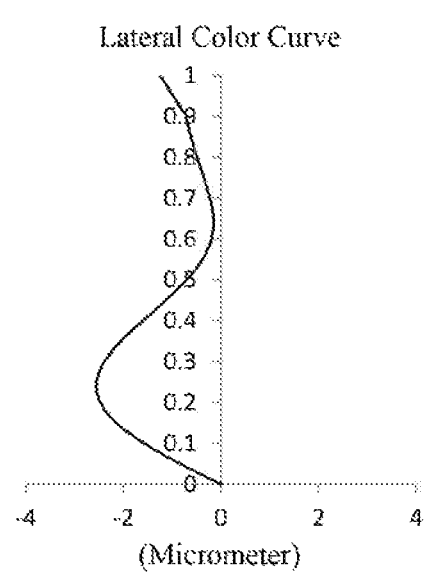

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion at different image heights. FIG. 4D illustrates a lateral color curve of the optical imaging lens assembly according to embodiment 2, representing deviations of different image heights on an imaging plane after light passes through the optical imaging lens assembly. It can be seen from FIG. 4A to FIG. 4D that the optical imaging lens assembly provided in embodiment 2 can achieve good image quality.

Embodiment 3

Figure 5:
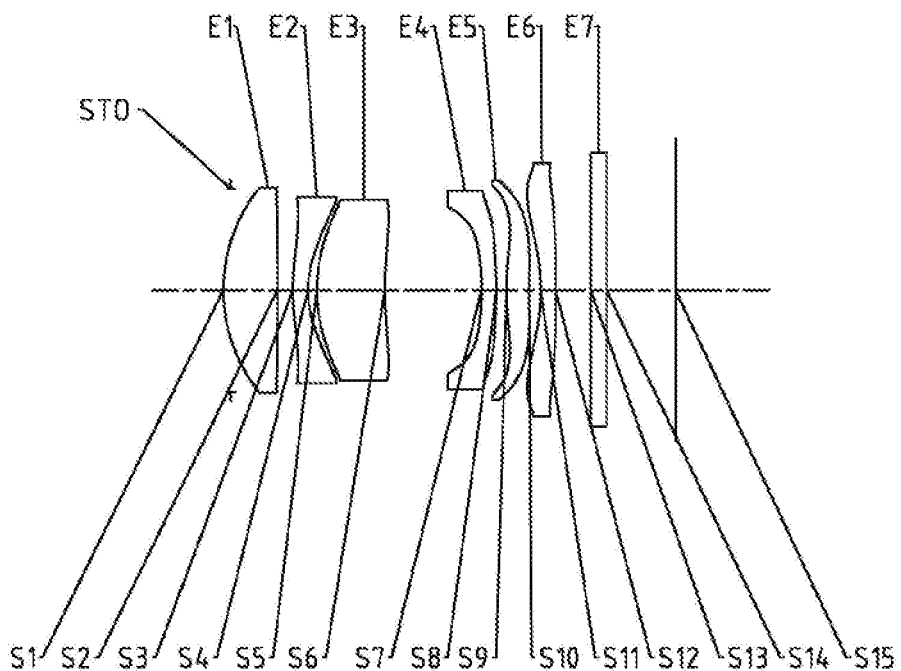
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The sixth lens E6 has a negative refractive power, an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 7 shows surface type, radius of curvature, thickness, material and conic coefficient of each lens of the optical imaging lens assembly in embodiment 3, wherein the units for the radius of curvature and the thickness are millimeter (mm). Table 8 shows high-order coefficients applicable to each aspheric surface in embodiment 3, wherein the surface type of each aspheric surface may be defined by the formula (1) given above in embodiment 1. Table 9 shows effective focal lengths f1 to f6 of lenses, the total effective focal length f, a total optical length TTL, and half of a maximal field-of-view angle HFOV of the optical imaging lens assembly in embodiment 3.

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | -0.1000 | | | |
| S1 | aspheric | 2.1229 | 0.7174 | 1.53 | 56.0 | 0.4677 |
| S2 | aspheric | -471.1521 | 0.2063 | | | -99.0000 |
| S3 | aspheric | 3.0232 | 0.2000 | 1.61 | 26.6 | -20.3839 |
| S4 | aspheric | 1.2732 | 0.1168 | | | -3.8910 |
| S5 | aspheric | 2.0184 | 0.9046 | 1.53 | 56.0 | -2.3329 |
| S6 | aspheric | 5.2820 | 1.2799 | | | -52.2950 |
| S7 | aspheric | -3.1891 | 0.2000 | 1.53 | 56.0 | 5.9964 |
| S8 | aspheric | -3.2783 | 0.1353 | | | -18.6165 |
| S9 | aspheric | 5.8282 | 0.3000 | 1.61 | 26.6 | -99.0000 |
| S10 | aspheric | 16.9852 | 0.1479 | | | -89.6703 |
| S11 | aspheric | -4.5222 | 0.2000 | 1.53 | 56.0 | -5.5553 |
| S12 | aspheric | 11.2153 | 0.4669 | | | -83.6612 |
| S13 | spherical | infinite | 0.2100 | 1.52 | 64.2 | |
| S14 | spherical | infinite | 0.9148 | | | |
| S15 | spherical | infinite | | | | |

TABLE 8

| Surface number | A4 | A6 | A8 | A10 | A12 | A14 | A16 | A18 | A20 |
|---|---|---|---|---|---|---|---|---|---|
| S1 | -6.6986E-03 | -2.5290E-02 | 8.2769E-02 | -1.6818E-01 | 2.0896E-01 | -1.6355E-01 | 7.8833E-02 | -2.1431E-02 | 2.5205E-03 |
| S2 | -6.3042E-03 | 3.1756E-02 | -8.5286E-02 | 1.2199E-01 | -1.1439E-01 | 7.3554E-02 | -3.0620E-02 | 7.1133E-03 | -6.4710E-04 |
| S3 | -9.7117E-02 | 2.1923E-01 | -5.7536E-01 | 1.0044E+00 | -1.2161E+00 | 1.0223E+00 | -5.6425E-01 | 1.8116E-01 | -2.5309E-02 |
| S4 | -4.4370E-02 | 3.5605E-01 | -1.3066E+00 | 3.1039E+00 | -5.1406E+00 | 5.7191E+00 | -3.9902E+00 | 1.5589E+00 | -2.5833E-01 |
| S5 | -2.0935E-02 | 1.7334E-01 | -7.1470E-01 | 1.9935E+00 | -3.7639E+00 | 4.5450E+00 | -3.3178E+00 | 1.3265E+00 | -2.2217E-01 |
| S6 | 2.1389E-04 | -3.7098E-02 | 3.3441E-03 | 7.5947E-02 | -1.9638E-01 | 2.6740E-01 | -2.1330E-01 | 9.3102E-02 | -1.7139E-02 |
| S7 | 2.8154E-01 | -1.1295E+00 | 2.2975E+00 | -3.0167E+00 | 1.2889E+00 | 1.9937E+00 | -3.3952E+00 | 2.0594E+00 | -4.6750E-01 |
| S8 | 5.9088E-01 | -2.4013E+00 | 5.8994E+00 | -9.8106E+00 | 1.0813E+01 | -7.7821E+00 | 3.5269E+00 | -9.1371E-01 | 1.0294E-01 |
| S9 | 3.1769E-01 | -1.3344E+00 | 2.6511E+00 | -3.3105E+00 | 2.5262E+00 | -1.1027E+00 | 2.2536E-01 | -2.6145E-03 | -4.1749E-03 |
| S10 | -9.4332E-02 | -4.5138E-02 | -1.7765E-01 | 8.3610E-01 | -1.3739E+00 | 1.2005E+00 | -5.9313E-01 | 1.5612E-01 | -1.7000E-02 |
| S11 | -3.0859E-01 | 6.6574E-01 | -8.5328E-01 | 8.6680E-01 | -6.6078E-01 | 3.4181E-01 | -1.0997E-01 | 1.9699E-02 | -1.5007E-03 |
| S12 | -2.4415E-01 | 4.5418E-01 | -5.1055E-01 | 3.7065E-01 | -1.7514E-01 | 5.0009E-02 | -7.0094E-03 | 1.3583E-04 | 4.5060E-05 |

TABLE 9

| | |
|---|---|
| f1 (mm) | 3.96 |
| f2 (mm) | -3.75 |
| f3 (mm) | 5.58 |
| f4 (mm) | -1001.23 |
| f5 (mm) | 14.34 |
| f6 (mm) | -6.01 |
| f (mm) | 6.08 |
| TTL (mm) | 6.00 |
| HFOV (°) | 18.2 |

Figure 6A:
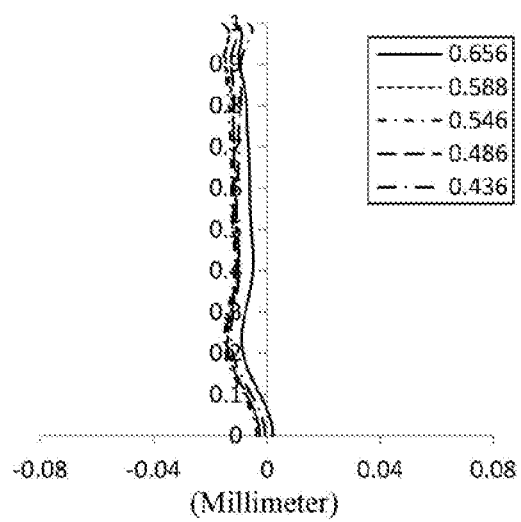
FIGS. 6A-6D illustrate a longitudinal aberration curve, an astigmatic curve, a distortion curve and a lateral color curve of the optical imaging lens assembly according to embodiment 3, respectively.
Figure 6B:
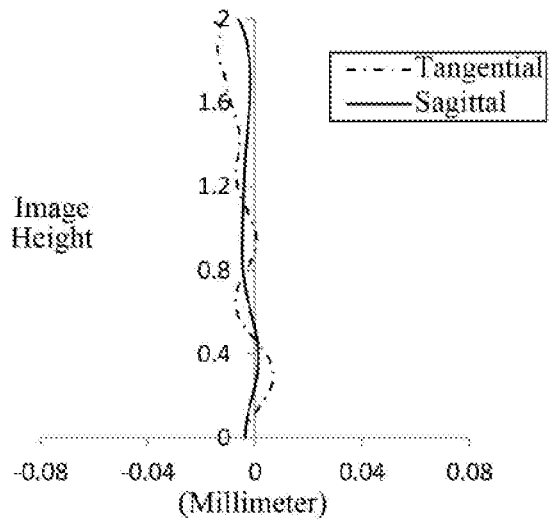
Figure 6C:
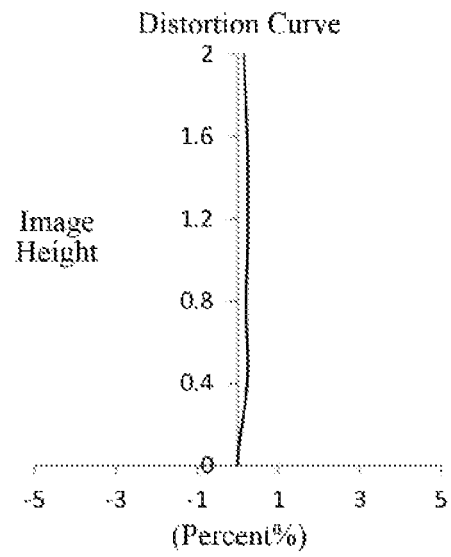
Figure 6D:
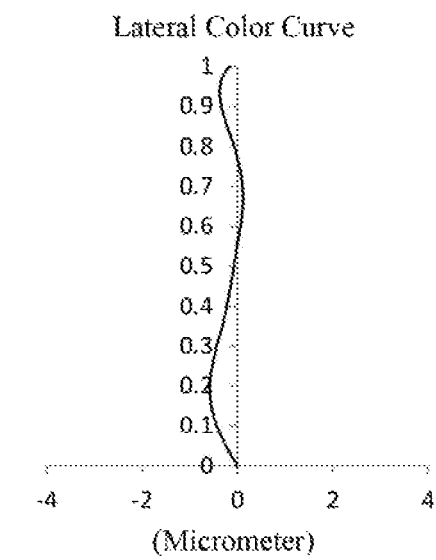

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion at different image heights. FIG. 6D illustrates a lateral color curve of the optical imaging lens assembly according to embodiment 3, representing deviations of different image heights on an imaging plane after light passes through the optical imaging lens assembly. It can be seen from FIG. 6A to FIG. 6D that the optical imaging lens assembly provided in embodiment 3 can achieve good image quality.

Embodiment 4

Figure 7:
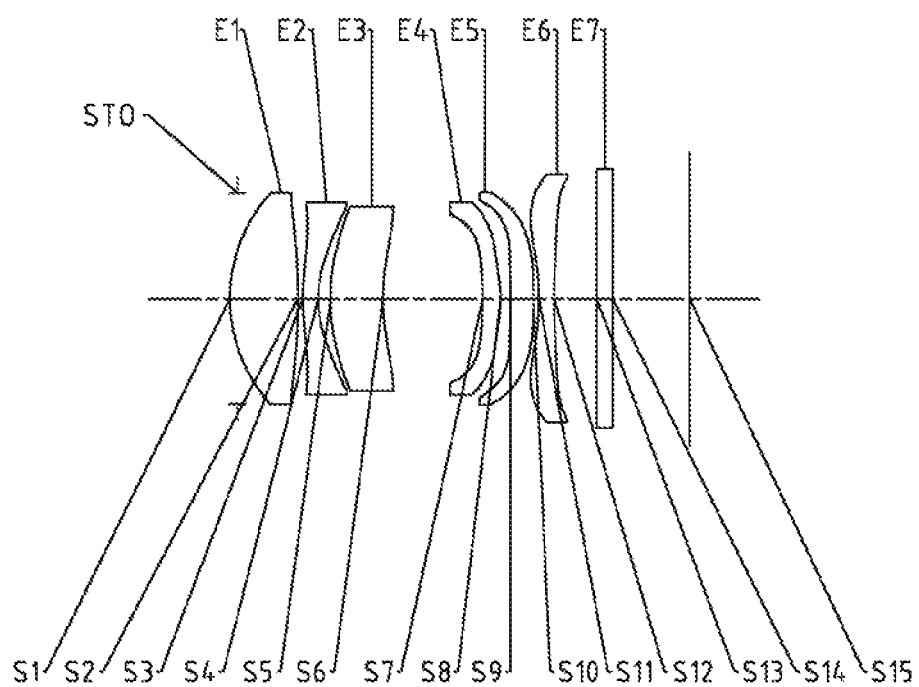
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a negative refractive power, an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 10 shows surface type, radius of curvature, thickness, material and conic coefficient of each lens of the optical imaging lens assembly in embodiment 4, wherein the units for the radius of curvature and the thickness are millimeter (mm). Table 11 shows high-order coefficients applicable to each aspheric surface in embodiment 4, wherein the surface type of each aspheric surface may be defined by the formula (1) given above in embodiment 1. Table 12 shows effective focal lengths f1 to f6 of lenses, the total effective focal length f, a total optical length TTL, and half of a maximal field-of-view angle HFOV of the optical imaging lens assembly in embodiment 4.

TABLE 10

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | -0.1000 | | | |
| S1 | aspheric | 2.0098 | 0.8859 | 1.53 | 56.0 | 0.4421 |
| S2 | aspheric | -17.4620 | 0.0682 | | | 99.0000 |
| S3 | aspheric | 3.1104 | 0.2000 | 1.61 | 26.6 | -26.4405 |
| S4 | aspheric | 1.5731 | 0.1593 | | | -3.1641 |
| S5 | aspheric | 3.1552 | 0.6865 | 1.53 | 56.0 | 0.3792 |
| S6 | aspheric | 2.8993 | 1.2996 | | | -21.6120 |
| S7 | aspheric | -3.5032 | 0.2331 | 1.53 | 56.0 | 7.4154 |
| S8 | aspheric | -1.5002 | 0.1293 | | | -19.3453 |
| S9 | aspheric | -6.2176 | 0.3000 | 1.61 | 26.6 | 19.0987 |
| S10 | aspheric | -14.7306 | 0.0693 | | | 91.6655 |
| S11 | aspheric | -4.3498 | 0.2000 | 1.53 | 56.0 | -63.2884 |
| S12 | aspheric | 7.6550 | 0.5542 | | | 20.7263 |
| S13 | spherical | infinite | 0.2100 | 1.52 | 64.2 | |
| S14 | spherical | infinite | 1.0047 | | | |
| S15 | spherical | infinite | | | | |

TABLE 11

| Surface number | A4 | A6 | A8 | A10 | A12 | A14 | A16 | A18 | A20 |
|---|---|---|---|---|---|---|---|---|---|
| S1 | -9.3490E-03 | -3.6196E-02 | 1.2064E-01 | -2.2522E-01 | 2.5293E-01 | -1.7765E-01 | 7.6469E-02 | -1.8524E-02 | 1.9409E-03 |
| S2 | -1.9266E-01 | 6.1942E-01 | -1.2058E+00 | 1.5754E+00 | -1.3890E+00 | 8.1366E-01 | -3.0300E-01 | 6.4826E-02 | -6.0456E-03 |
| S3 | -1.2226E-01 | 3.0680E-01 | -9.1032E-01 | 1.7616E+00 | -2.1348E+00 | 1.6293E+00 | -7.6642E-01 | 2.0409E-01 | -2.3616E-02 |
| S4 | 1.6462E-01 | -2.3784E-01 | -8.8045E-01 | 3.7504E+00 | -6.5020E+00 | 6.4634E+00 | -3.8507E+00 | 1.2838E+00 | -1.8411E-01 |
| S5 | 1.3859E-01 | -1.3025E-01 | -6.8620E-01 | 2.3862E+00 | -3.7588E+00 | 3.5466E+00 | -2.0736E+00 | 6.9485E-01 | -1.0145E-01 |
| S6 | 7.1653E-02 | -1.5298E-01 | 7.4639E-02 | 2.1847E-01 | -5.4481E-01 | 5.8990E-01 | -3.5516E-01 | 1.1436E-01 | -1.5276E-02 |
| S7 | 1.5881E-01 | -5.9749E-02 | -3.2684E-01 | -1.2005E+00 | 5.4682E+00 | -9.4387E+00 | 8.7040E+00 | -4.2265E+00 | 8.4615E-01 |
| S8 | -2.1842E-02 | 1.4921E+00 | -6.1066E+00 | 1.1997E+01 | -1.4609E+01 | 1.1496E+01 | -5.6341E+00 | 1.5475E+00 | -1.8030E-01 |
| S9 | 2.7609E-01 | -2.8840E-01 | -3.6545E-01 | 5.8284E-01 | -5.0618E-02 | -3.9860E-01 | 3.5625E-01 | -1.4319E-01 | 2.4190E-02 |
| S10 | -2.7807E-01 | 6.4453E-01 | -1.5454E+00 | 2.3317E+00 | -2.2164E+00 | 1.3522E+00 | -5.2618E-01 | 1.2034E-01 | -1.2286E-02 |
| S11 | -1.6721E-01 | -3.9015E-02 | 5.9769E-01 | -7.3043E-01 | 3.9942E-01 | -9.8818E-02 | 3.3773E-03 | 2.9451E-03 | -3.9147E-04 |
| S12 | 1.9602E-02 | -4.4330E-01 | 1.2789E+00 | -1.9690E+00 | 1.8458E+00 | -1.0820E+00 | 3.8732E-01 | -7.7301E-02 | 6.5780E-03 |

TABLE 12

| | |
|---|---|
| f1 (mm) | 3.43 |
| f2 (mm) | -5.46 |
| f3 (mm) | -1007.79 |
| f4 (mm) | 4.72 |
| f5 (mm) | -17.80 |

TABLE 12-continued

| | |
|---|---|
| f6 (mm) | −5.17 |
| f (mm) | 6.08 |
| TTL (mm) | 6.00 |
| HFOV (°) | 17.0 |

Figure 8A:
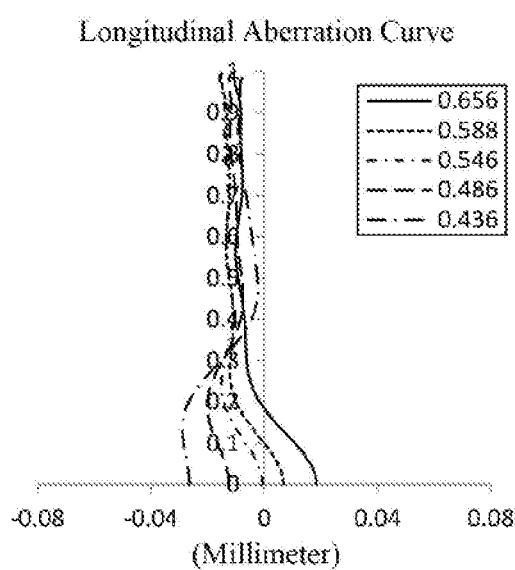
FIGS. 8A-8D illustrate a longitudinal aberration curve, an astigmatic curve, a distortion curve and a lateral color curve of the optical imaging lens assembly according to embodiment 4, respectively.
Figure 8B:
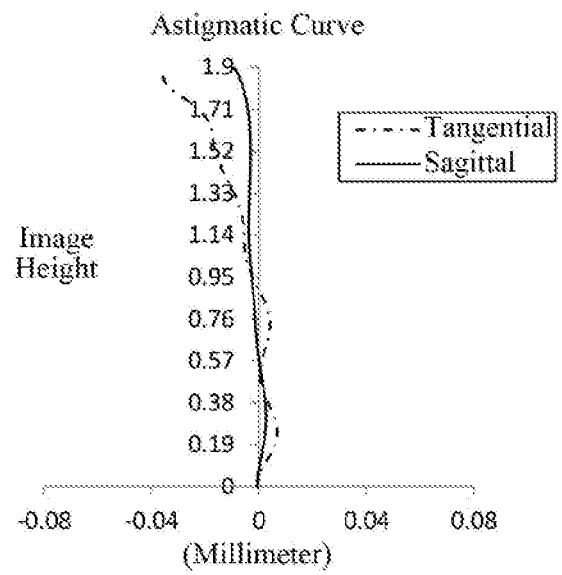
Figure 8C:
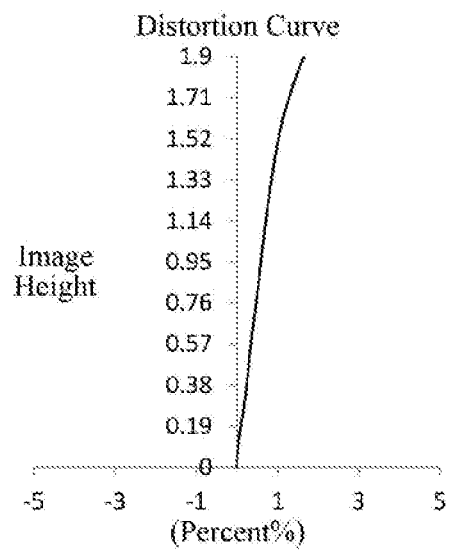
Figure 8D:
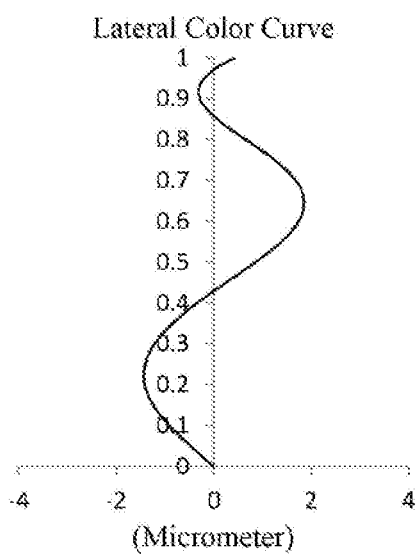

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion at different image heights. FIG. 8D illustrates a lateral color curve of the optical imaging lens assembly according to embodiment 4, representing deviations of different image heights on an imaging plane after light passes through the optical imaging lens assembly. It can be seen from FIG. 8A to FIG. 8D that the optical imaging lens assembly provided in embodiment 4 can achieve good image quality.

Embodiment 5

Figure 9:
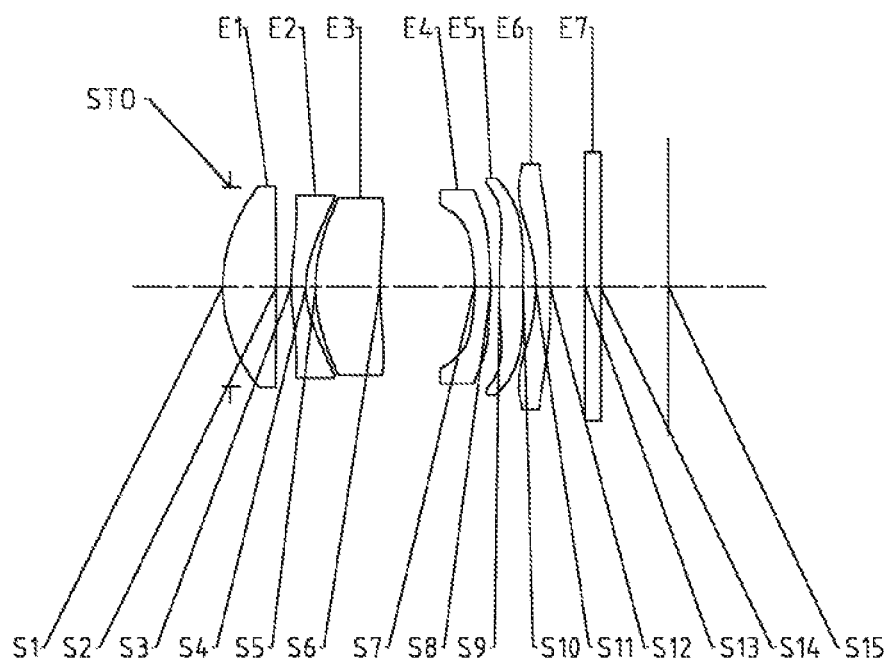
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The sixth lens E6 has a negative refractive power, an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 13 shows surface type, radius of curvature, thickness, material and conic coefficient of each lens of the optical imaging lens assembly in embodiment 5, wherein the units for the radius of curvature and the thickness are millimeter (mm). Table 14 shows high-order coefficients applicable to each aspheric surface in embodiment 5, wherein the surface type of each aspheric surface may be defined by the formula (1) given above in embodiment 1. Table 15 shows effective focal lengths f1 to f6 of lenses, the total effective focal length f, a total optical length TTL, and half of a maximal field-of-view angle HFOV of the optical imaging lens assembly in embodiment 5.

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.1000 | | | |
| S1 | aspheric | 2.1179 | 0.7201 | 1.53 | 56.0 | 0.4705 |
| S2 | aspheric | 1483.6488 | 0.1993 | | | 99.0000 |
| S3 | aspheric | 2.7483 | 0.2000 | 1.61 | 26.6 | −19.9544 |
| S4 | aspheric | 1.2463 | 0.1290 | | | −3.9414 |
| S5 | aspheric | 2.1001 | 0.8714 | 1.53 | 56.0 | −2.2630 |
| S6 | aspheric | 5.3237 | 1.2686 | | | −56.2994 |
| S7 | aspheric | −3.1826 | 0.2202 | 1.53 | 56.0 | 6.0675 |
| S8 | aspheric | −2.5219 | 0.1155 | | | −17.7174 |
| S9 | aspheric | 13.6949 | 0.3181 | 1.61 | 26.6 | −84.7599 |
| S10 | aspheric | 17.4816 | 0.1681 | | | 88.0388 |
| S11 | aspheric | −3.4015 | 0.2000 | 1.53 | 56.0 | −4.5127 |
| S12 | aspheric | −164.9617 | 0.4659 | | | −99.0000 |
| S13 | spherical | infinite | 0.2100 | 1.52 | 64.2 | |
| S14 | spherical | infinite | 0.9137 | | | |
| S15 | spherical | infinite | | | | |

TABLE 14

| Surface number | A4 | A6 | A8 | A10 | A12 | A14 | A16 | A18 | A20 |
|---|---|---|---|---|---|---|---|---|---|
| S1 | −3.6878E−03 | −3.8728E−02 | 1.2155E−01 | −2.3343E−01 | 2.7286E−01 | −1.9853E−01 | 8.8043E−02 | −2.1886E−02 | 2.3504E−03 |
| S2 | −6.4552E−03 | 3.0095E−02 | −7.6261E−02 | 9.2780E−02 | −5.8713E−02 | 1.4925E−02 | 3.0873E−03 | −2.7925E−03 | 5.0690E−04 |
| S3 | −9.2423E−02 | 2.2522E−01 | −6.8595E−01 | 1.3504E+00 | −1.7443E+00 | 1.4731E+00 | −7.8226E−01 | 2.3642E−01 | −3.0918E−02 |
| S4 | −5.7631E−02 | 4.6966E−01 | −1.8621E+00 | 4.5578E+00 | −7.2445E+00 | 7.3973E+00 | −4.6542E+00 | 1.6372E+00 | −2.4580E−01 |
| S5 | −2.9211E−02 | 2.4901E−01 | −1.0541E+00 | 2.7778E+00 | −4.6997E+00 | 5.0244E+00 | −3.2623E+00 | 1.1714E+00 | −1.7818E−01 |
| S6 | −2.8660E−04 | −2.0075E−02 | −9.9492E−02 | 3.6315E−01 | −6.7455E−01 | 7.5227E−01 | −5.0158E−01 | 1.8365E−01 | −2.8419E−02 |
| S7 | 2.0817E−01 | −6.2925E−01 | 6.3644E−01 | 2.6025E−01 | −2.8386E+00 | 5.1579E+00 | −4.6331E+00 | 2.1586E+00 | −4.1587E−01 |
| S8 | 5.0978E−01 | −1.7433E+00 | 3.8720E+00 | −6.3323E+00 | 6.9789E+00 | −4.9828E+00 | 2.2223E+00 | −5.6418E−01 | 6.2170E−02 |
| S9 | 2.8490E−01 | −1.1013E+00 | 2.2953E+00 | −3.2347E+00 | 2.9114E+00 | −1.6146E+00 | 5.2162E−01 | −8.6996E−02 | 5.4122E−03 |
| S10 | −1.3392E−01 | 4.8607E−02 | −9.9244E−02 | 2.6358E−01 | −4.1985E−01 | 3.8990E−01 | −2.0783E−01 | 5.8462E−02 | −6.6911E−03 |
| S11 | −2.6562E−01 | 4.5959E−01 | −4.3956E−01 | 3.6315E−01 | −2.5733E−01 | 1.3231E−01 | −4.2949E−02 | 7.7563E−03 | −5.9482E−04 |
| S12 | −1.9603E−01 | 2.9016E−01 | −2.4041E−01 | 1.3254E−01 | −6.0147E−02 | 2.3846E−02 | −6.8312E−03 | 1.1358E−03 | −8.1244E−05 |

TABLE 15

| | |
|---|---|
| f1 (mm) | 3.97 |
| f2 (mm) | -3.92 |
| f3 (mm) | 5.94 |
| f4 (mm) | 20.39 |
| f5 (mm) | 100.00 |
| f6 (mm) | -6.51 |
| f (mm) | 6.08 |
| TTL (mm) | 6.00 |
| HFOV (°) | 18.0 |

Figures 10A, 10B:
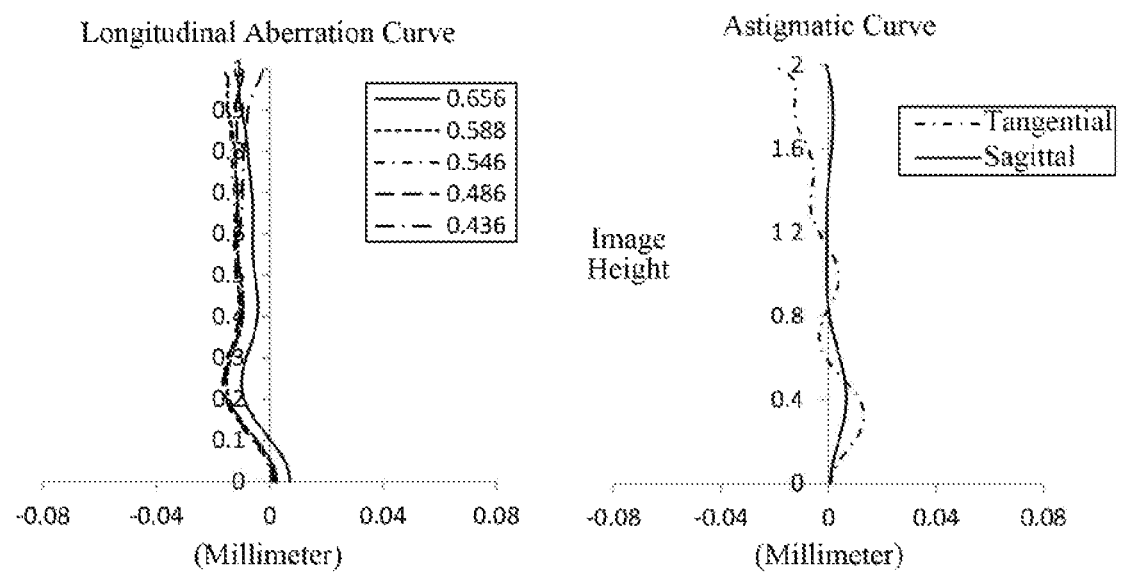
FIGS. 10A-10D illustrate a longitudinal aberration curve, an astigmatic curve, a distortion curve and a lateral color curve of the optical imaging lens assembly according to embodiment 5, respectively.
Figure 10C:
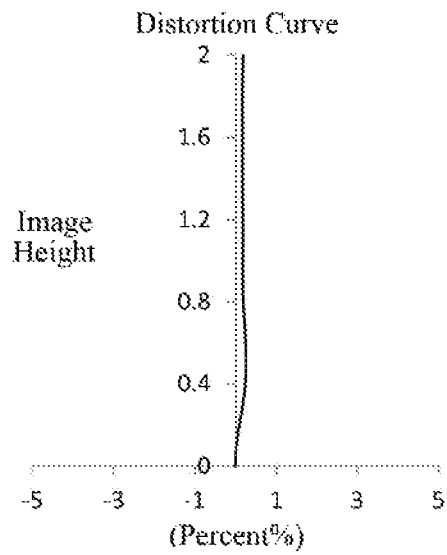
Figure 10D:
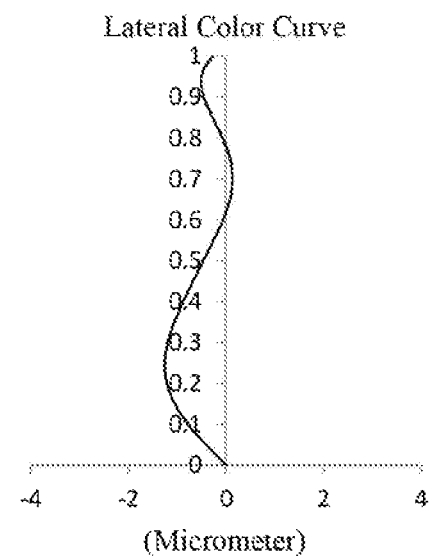

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion at different image heights. FIG. 10D illustrates a lateral color curve of the optical imaging lens assembly according to embodiment 5, representing deviations of different image heights on an imaging plane after light passes through the optical imaging lens assembly. It can be seen from FIG. 10A to FIG. 10D that the optical imaging lens assembly provided in embodiment 5 can achieve good image quality.

Embodiment 6

Figure 11:
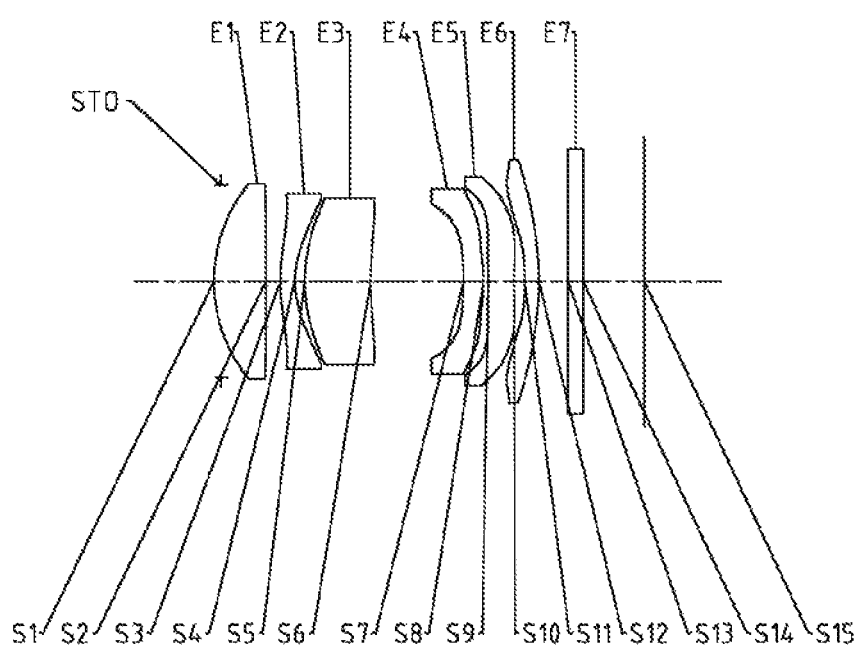
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 16 shows surface type, radius of curvature, thickness, material and conic coefficient of each lens of the optical imaging lens assembly in embodiment 6, wherein the units for the radius of curvature and the thickness are millimeter (mm). Table 17 shows high-order coefficients applicable to each aspheric surface in embodiment 6, wherein the surface type of each aspheric surface may be defined by the formula (1) given above in embodiment 1. Table 18 shows effective focal lengths f1 to f6 of lenses, the total effective focal length f, a total optical length TTL, and half of a maximal field-of-view angle HFOV of the optical imaging lens assembly in embodiment 6.

TABLE 16

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | -0.1000 | | | |
| S1 | aspheric | 2.1134 | 0.7262 | 1.53 | 56.0 | 0.4738 |
| S2 | aspheric | -971.5254 | 0.2023 | | | 99.0000 |
| S3 | aspheric | 2.3939 | 0.2000 | 1.61 | 26.6 | -18.8044 |
| S4 | aspheric | 1.1957 | 0.1388 | | | -3.9965 |
| S5 | aspheric | 2.1671 | 0.9196 | 1.53 | 56.0 | -2.2809 |
| S6 | aspheric | 4.8615 | 1.2952 | | | -49.0265 |
| S7 | aspheric | -3.1867 | 0.2768 | 1.53 | 56.0 | 5.7932 |
| S8 | aspheric | -1.5028 | 0.0682 | | | -23.6824 |
| S9 | aspheric | -5.3365 | 0.3579 | 1.61 | 26.6 | 15.1616 |
| S10 | aspheric | 3.5997 | 0.1486 | | | -99.0000 |
| S11 | aspheric | -3.7898 | 0.2000 | 1.53 | 56.0 | -1.4322 |
| S12 | aspheric | -3.8321 | 0.4042 | | | -91.7492 |
| S13 | spherical | infinite | 0.2100 | 1.52 | 64.2 | |
| S14 | spherical | infinite | | | | |
| S15 | spherical | infinite | | | | |

TABLE 17

| Surface number | A4 | A6 | A8 | A10 | A12 | A14 | A16 | A18 | A20 |
|---|---|---|---|---|---|---|---|---|---|
| S1 | -2.0049E-03 | -4.5466E-02 | 1.4501E-01 | -2.8788E-01 | 3.5407E-01 | -2.7422E-01 | 1.3061E-01 | -3.5107E-02 | 4.0922E-03 |
| S2 | -8.6527E-03 | 2.2551E-02 | -4.1579E-02 | 3.2176E-02 | 2.4373E-03 | -2.2906E-02 | 1.7233E-02 | -5.8825E-03 | 8.5720E-04 |
| S3 | -6.3325E-02 | 5.6282E-02 | -5.1178E-02 | -1.2182E-01 | 3.8401E-01 | -4.4585E-01 | 2.6071E-01 | -7.4402E-02 | 7.9397E-03 |
| S4 | -4.3350E-02 | 2.0901E-01 | -4.2662E-01 | 4.2005E-01 | -2.4039E-01 | 2.9307E-01 | -4.7503E-01 | 3.4847E-01 | -8.9362E-02 |
| S5 | -2.5167E-02 | 7.9916E-02 | -1.1341E-01 | 1.2669E-01 | -3.3970E-01 | 8.0193E-01 | -9.6540E-01 | 5.5550E-01 | -1.2255E-01 |
| S6 | 1.6399E-03 | -3.7416E-02 | 4.2558E-03 | 3.6265E-02 | -3.4151E-02 | -1.9277E-03 | 1.6909E-02 | -8.1753E-03 | 9.8372E-04 |
| S7 | 1.0884E-01 | 1.3668E-01 | -1.8279E+00 | 1.5410E+00 | 5.7797E+00 | -1.6444E+01 | 1.8149E+01 | -9.5501E+00 | 1.9790E+00 |
| S8 | 1.8172E-01 | 1.8370E+00 | -1.0026E+01 | 2.2065E+01 | -2.7758E+01 | 2.1365E+01 | -9.9306E+00 | 2.5595E+00 | -2.8114E-01 |
| S9 | 4.2450E-01 | -5.3109E-01 | -1.0037E-01 | -1.0282E-01 | 2.0025E+00 | -3.3954E+00 | 2.5486E+00 | -9.3274E-01 | 1.3607E-01 |
| S10 | -3.1098E-01 | 2.5522E-01 | -1.8107E-01 | 6.7452E-03 | 2.5792E-01 | -3.7437E-01 | 2.4315E-01 | -7.6603E-02 | 9.5144E-03 |
| S11 | -7.7703E-02 | -6.9067E-01 | 2.3644E+00 | -3.3411E+00 | 2.6627E+00 | -1.2857E+00 | 3.7468E-01 | -6.0901E-02 | 4.2515E-03 |
| S12 | -8.2185E-02 | -1.9686E-01 | 9.5345E-01 | -1.5238E+00 | 1.3137E+00 | -6.7857E-01 | 2.1077E-01 | -3.6331E-02 | 2.6672E-03 |

TABLE 18

| | |
|---|---|
| f1 (mm) | 3.95 |
| f2 (mm) | -4.16 |
| f3 (mm) | 6.55 |
| f4 (mm) | 5.04 |
| f5 (mm) | -3.46 |
| f6 (mm) | 997.53 |
| f (mm) | 6.08 |
| TTL (mm) | 6.00 |
| HFOV (°) | 18.2 |

Figure 12A:
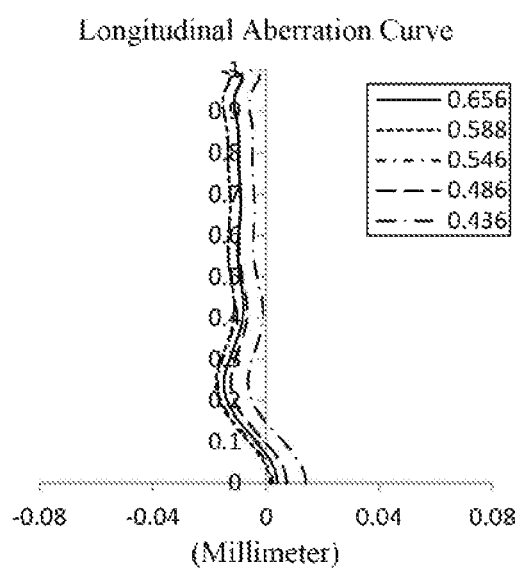
FIGS. 12A-12D illustrate a longitudinal aberration curve, an astigmatic curve, a distortion curve and a lateral color curve of the optical imaging lens assembly according to embodiment 6, respectively.
Figure 12B:
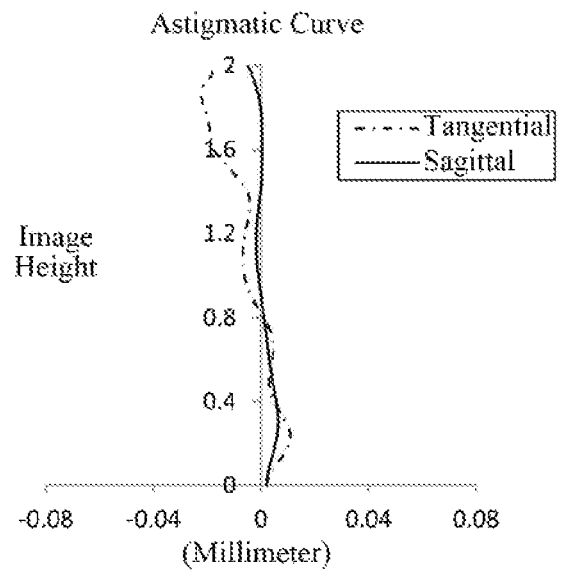
Figure 12C:
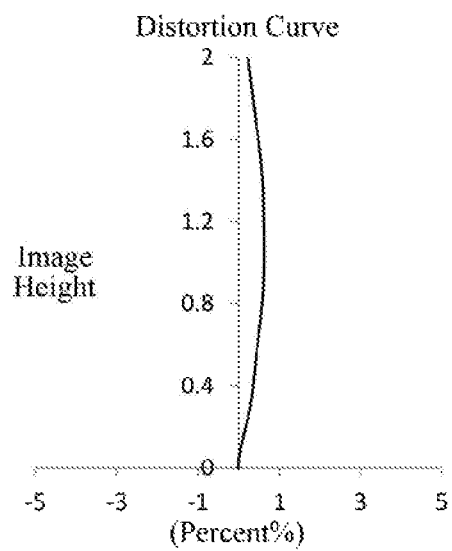
Figure 12D:
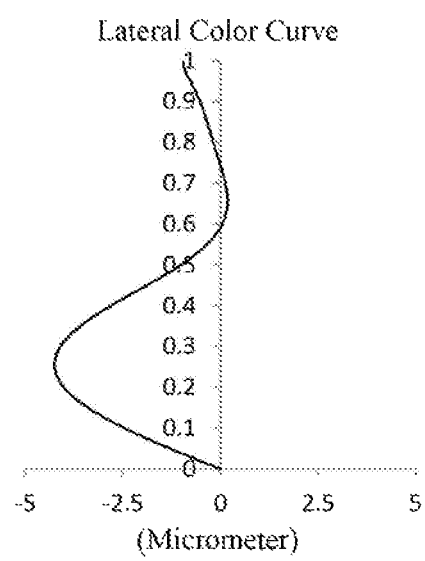

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of as sagittal plane. FIG. 12C illustrates a distortion curve of the optical imaging lens assembly according to embodiment 6, representing amounts of distortion at different image heights. FIG. 12D illustrates a lateral color curve of the optical imaging lens assembly according to embodiment 6, representing deviations of different image heights on an imaging plane after light passes through the optical imaging lens assembly. It can be seen from FIG. 12A to FIG. 12D that the optical imaging lens assembly provided in embodiment 6 can achieve good image quality.

Embodiment 7

Figure 13:
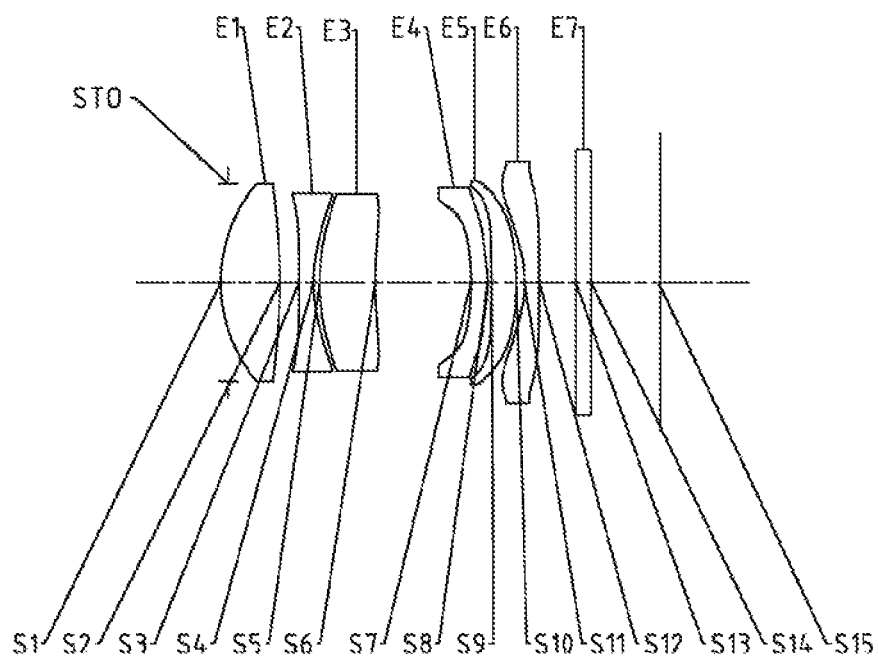
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 19 shows surface type, radius of curvature, thickness, material and conic coefficient of each lens of the optical imaging lens assembly in embodiment 7, wherein the units for the radius of curvature and the thickness are millimeter (mm). Table 20 shows high-order coefficients applicable to each aspheric surface in embodiment 7, wherein the surface type of each aspheric surface may be defined by the formula (1) given above in embodiment 1. Table 21 shows effective focal lengths f1 to f6 of lenses, the total effective focal length f, a total optical length TTL, and half of a maximal field-of-view angle HFOV of the optical imaging lens assembly in embodiment 7.

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | -0.1000 | | | |
| S1 | aspheric | 2.0903 | 0.8051 | 1.53 | 56.0 | 0.4918 |
| S2 | aspheric | -7.3319 | 0.2601 | | | -76.7750 |
| S3 | aspheric | -1144.6615 | 0.2000 | 1.61 | 26.6 | -99.0000 |
| S4 | aspheric | 2.1186 | 0.0845 | | | -4.5001 |
| S5 | aspheric | 2.9131 | 0.7584 | 1.53 | 56.0 | -2.1775 |
| S6 | aspheric | 5.5995 | 1.3054 | | | -55.1671 |
| S7 | aspheric | -3.3793 | 0.2274 | 1.53 | 56.0 | 6.6958 |
| S8 | aspheric | -1.5420 | 0.0500 | | | -16.8144 |
| S9 | aspheric | -5.5238 | 0.3431 | 1.61 | 26.6 | 16.0259 |
| S10 | aspheric | -4.7759 | 0.1097 | | | -88.9138 |
| S11 | aspheric | -1.9117 | 0.2000 | 1.53 | 56.0 | -6.7510 |
| S12 | aspheric | 70.5480 | 0.4993 | | | 99.0000 |
| S13 | spherical | infinite | 0.2100 | 1.52 | 64.2 | |
| S14 | spherical | infinite | 0.9471 | | | |
| S15 | spherical | infinite | | | | |

TABLE 20

| Surface number | A4 | A6 | A8 | A10 | A12 | A14 | A16 | A18 | A20 |
|---|---|---|---|---|---|---|---|---|---|
| S1 | -1.1674E-03 | -5.1337E-02 | 1.8088E-01 | -3.8076E-01 | 4.9266E-01 | -3.9992E-01 | 1.9858E-01 | -5.5079E-02 | 6.5219E-03 |
| S2 | -1.1072E-02 | 5.7466E-02 | -1.7319E-01 | 2.7329E-01 | -2.5576E-01 | 1.4809E-01 | -5.0768E-02 | 8.6420E-03 | -3.9431E-04 |
| S3 | -9.8576E-02 | 5.3124E-01 | -2.1092E+00 | 4.5149E+00 | -5.8731E+00 | 4.8517E+00 | -2.5088E+00 | 7.4405E-01 | -9.6638E-02 |
| S4 | -1.4637E-01 | 1.2251E+00 | -4.3874E+00 | 8.5402E+00 | -1.0081E+01 | 7.5945E+00 | -3.7040E+00 | 1.1097E+00 | -1.5810E-01 |
| SS | -1.0722E-01 | 7.5272E-01 | -2.1517E+00 | 3.1222E+00 | -2.2496E+00 | 5.0607E-01 | 2.6054E-01 | -1.4960E-01 | 1.6012E-02 |
| S6 | -1.4791E-02 | 7.1389E-04 | 2.4393E-02 | -2.0195E-01 | 4.9662E-01 | -6.4860E-01 | 4.7641E-01 | -1.8604E-01 | 2.9993E-02 |
| S7 | 1.2893E-01 | -5.2903E-01 | 1.5612E+00 | -5.1936E+00 | 1.2369E+01 | -1.8603E+01 | 1.6288E+01 | -7.5398E+00 | 1.4267E+00 |
| S8 | 3.8108E-01 | -6.6922E-01 | -1.5632E+00 | 8.1157E+00 | -1.4603E+01 | 1.4023E+01 | -7.6095E+00 | 2.2069E+00 | -2.6706E-01 |
| S9 | 4.9741E-01 | -1.0009E+00 | -1.5428E-01 | 3.5366E+00 | -6.4223E+00 | 5.8538E+00 | -2.9860E+00 | 8.0639E-01 | -8.9253E-02 |
| S10 | -5.4005E-01 | 1.8928E+00 | -4.2329E+00 | 5.9661E+00 | -5.6951E+00 | 3.6839E+00 | -1.5253E+00 | 3.5803E-01 | -3.5638E-02 |
| S11 | -5.2596E-01 | 2.0029E+00 | -3.7023E+00 | 4.1142E+00 | -2.9723E+00 | 1.4219E+00 | -4.3413E-01 | 7.6278E-02 | -5.8465E-03 |
| S12 | -1.4191E-01 | 4.9128E-01 | -1.0109E+00 | 1.2400E+00 | -9.7473E-01 | 4.9250E-01 | -1.5417E-01 | 2.7244E-02 | -2.0814E-03 |

TABLE 21

| | |
|---|---|
| f1 (mm) | 3.14 |
| f2 (mm) | −3.45 |
| f3 (mm) | 10.36 |
| f4 (mm) | 5.09 |
| f5 (mm) | 49.03 |
| f6 (mm) | −3.48 |
| f (mm) | 6.08 |
| TTL (mm) | 6.00 |
| HFOV (°) | 17.5 |

Figure 14A:
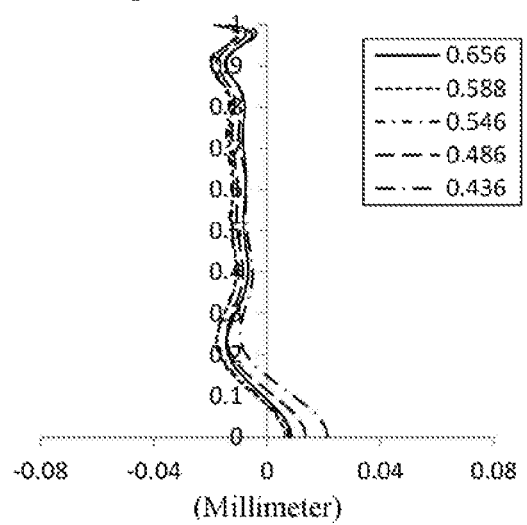
FIGS. 14A-14D illustrate a longitudinal aberration curve, an astigmatic curve, a distortion curve and a lateral color curve of the optical imaging lens assembly according to embodiment 7, respectively.
Figure 14B:
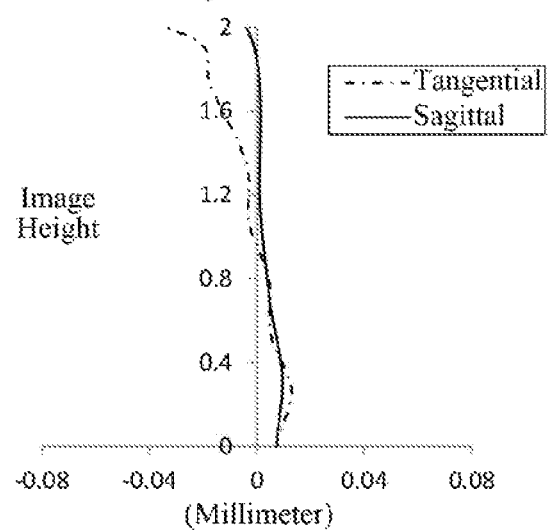
Figure 14C:
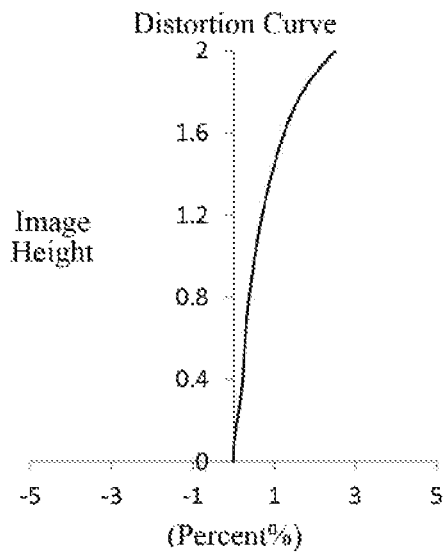
Figure 14D:
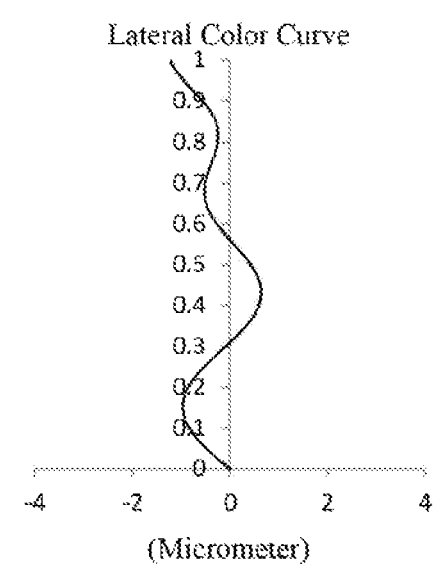

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion at different image heights. FIG. 14D illustrates a lateral color curve of the optical imaging lens assembly according to embodiment 7, representing deviations of different image heights on an imaging plane after light passes through the optical imaging lens assembly. It can be seen from FIG. 14A to FIG. 14D that the optical imaging lens assembly provided in embodiment 7 can achieve good image quality.

Embodiment 8

Figure 15:
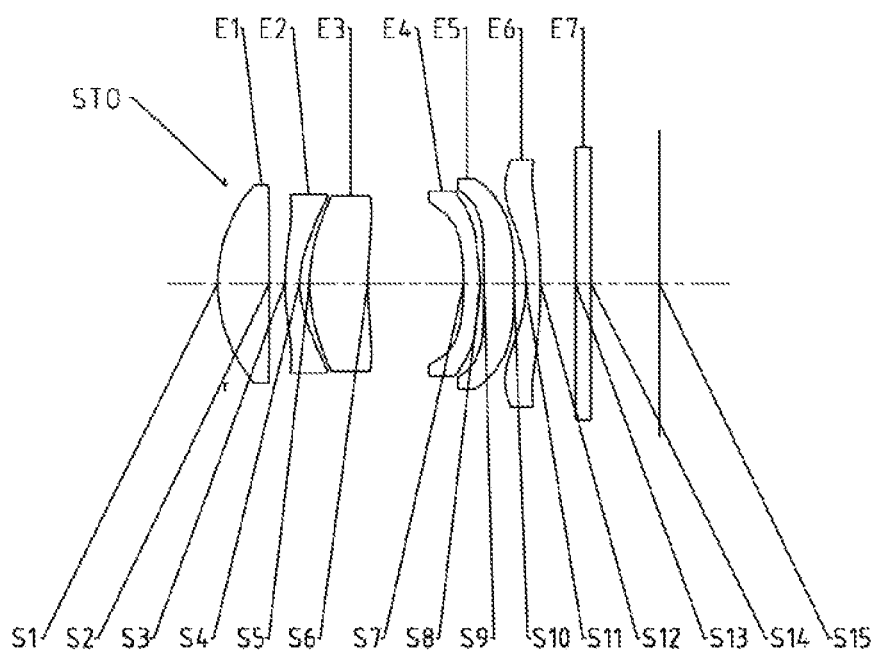
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a negative refractive power, an object-side surface S11 thereof is a concave surface, and an image-side surface S12 thereof is a convex surface. The optical filter E7 has an object-side surface S13 and an image-side surface S14. Light from the object sequentially passes through the respective surfaces S1 to S14 and is finally imaged on the imaging plane S15.

Table 22 shows surface type, radius of curvature, thickness, material and conic coefficient of each lens of the optical imaging lens assembly in embodiment 8, wherein the units for the radius of curvature and the thickness are millimeter (mm). Table 23 shows high-order coefficients applicable to each aspheric surface in embodiment 8, wherein the surface type of each aspheric surface may be defined by the formula (1) given above in embodiment 1. Table 24 shows effective focal lengths f1 to f6 of lenses, the total effective focal length f, a total optical length TTL, and half of a maximal field-of-view angle HFOV of the optical imaging lens assembly in embodiment 8.

TABLE 22

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.1000 | | | |
| S1 | aspheric | 2.1009 | 0.6982 | 1.53 | 56.0 | 0.4739 |
| S2 | aspheric | 229.8968 | 0.2152 | | | −99.0000 |
| S3 | aspheric | 2.6039 | 0.2000 | 1.61 | 26.6 | −19.4454 |
| S4 | aspheric | 1.2572 | 0.1340 | | | −4.0008 |
| S5 | aspheric | 2.1977 | 0.7938 | 1.53 | 56.0 | −2.3087 |
| S6 | aspheric | 4.9777 | 1.3011 | | | −53.7786 |
| S7 | aspheric | −3.1604 | 0.2281 | 1.53 | 56.0 | 5.8710 |
| S8 | aspheric | −1.4922 | 0.0500 | | | −15.3674 |
| S9 | aspheric | −5.0556 | 0.4050 | 1.61 | 26.6 | 14.3807 |
| S10 | aspheric | 87.5545 | 0.1613 | | | −99.0000 |
| S11 | aspheric | −2.5182 | 0.2000 | 1.53 | 56.0 | −4.3542 |
| S12 | aspheric | −13.5908 | 0.4777 | | | −99.0000 |
| S13 | spherical | infinite | 0.2100 | 1.52 | 64.2 | |
| S14 | spherical | infinite | 0.9256 | | | |
| S15 | spherical | infinite | | | | |

TABLE 23

| Surface number | A4 | A6 | A8 | A10 | A12 | A14 | A16 | A18 | A20 |
|---|---|---|---|---|---|---|---|---|---|
| S1 | −1.0880E−03 | −5.0415E−02 | 1.5179E−01 | −2.7399E−01 | 2.9716E−01 | −1.9702E−01 | 7.7966E−02 | −1.6903E−02 | 1.5458E−03 |
| S2 | −8.6087E−03 | 2.3644E−02 | −1.8554E−02 | −7.1157E−02 | 1.8757E−01 | −1.9763E−01 | 1.0846E−01 | −3.0584E−02 | 3.5105E−03 |
| S3 | −8.9603E−02 | 2.4470E−01 | −7.0554E−01 | 1.1578E+00 | −1.1275E+00 | 6.4869E−01 | −2.0714E−01 | 3.0582E−02 | −1.0203E−03 |
| S4 | −7.8660E−02 | 5.6680E−01 | −1.9076E+00 | 3.7283E+00 | −4.5748E+00 | 3.5772E+00 | −1.7373E+00 | 4.8054E−01 | −5.8171E−02 |
| S5 | −3.8270E−02 | 2.3867E−01 | −7.0647E−01 | 1.1953E+00 | −1.2488E+00 | 8.1683E−01 | −3.2399E−01 | 7.0937E−02 | −6.5595E−03 |
| S6 | 5.3261E−03 | −3.1448E−02 | −4.7344E−02 | 1.6207E−01 | −2.4763E−01 | 2.3333E−01 | −1.3566E−01 | 4.3401E−02 | −5.7373E−03 |
| S7 | 1.2873E−01 | 3.3551E−02 | −1.3183E+00 | 3.5326E+00 | −6.2833E+00 | 7.1735E+00 | −4.9138E+00 | 1.8436E+00 | −2.9086E−01 |
| S8 | 3.1946E−01 | −5.4536E−01 | 6.2154E−01 | −1.4441E+00 | 1.9908E+00 | −1.1748E+00 | 1.3341E−01 | 1.3688E−01 | −4.2033E−02 |
| S9 | 4.4052E−01 | −1.4795E+00 | 3.7274E+00 | −7.2070E+00 | 8.9857E+00 | −6.8366E+00 | 3.0554E+00 | −7.3517E−01 | 7.3340E−02 |
| S10 | −2.8422E−01 | 2.8270E−01 | −5.2358E−03 | −6.1990E−01 | 9.5101E−01 | −6.9533E−01 | 2.7895E−01 | −5.9426E−02 | 5.3211E−03 |
| S11 | −2.6324E−01 | 3.0626E−01 | 2.7772E−01 | −9.9551E−01 | 1.0831E+00 | −6.2162E−01 | 2.0207E−01 | −3.5280E−02 | 2.5796E−03 |
| S12 | −1.5201E−01 | 2.2908E−01 | −1.3993E−01 | 5.4693E−03 | 3.8426E−02 | −2.1096E−02 | 5.1117E−03 | −6.0564E−04 | 2.8574E−05 |

TABLE 24

| | |
|---|---|
| f1 (mm) | 3.97 |
| f2 (mm) | −4.20 |
| f3 (mm) | 6.70 |
| f4 (mm) | 5.05 |
| f5 (mm) | −7.79 |
| f6 (mm) | −5.83 |
| f (mm) | 6.18 |
| TTL (mm) | 6.00 |
| HFOV (°) | 18.5 |

Figure 16A:
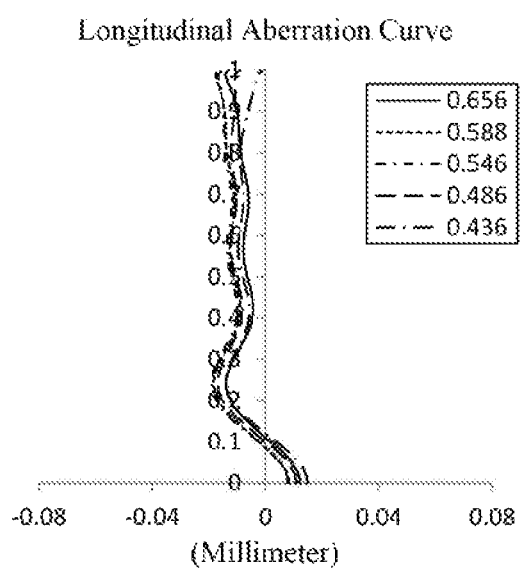
FIGS. 16A-16D illustrate a longitudinal aberration curve, an astigmatic curve, a distortion curve and a lateral color curve of the optical imaging lens assembly according to embodiment 8, respectively.
Figure 16B:
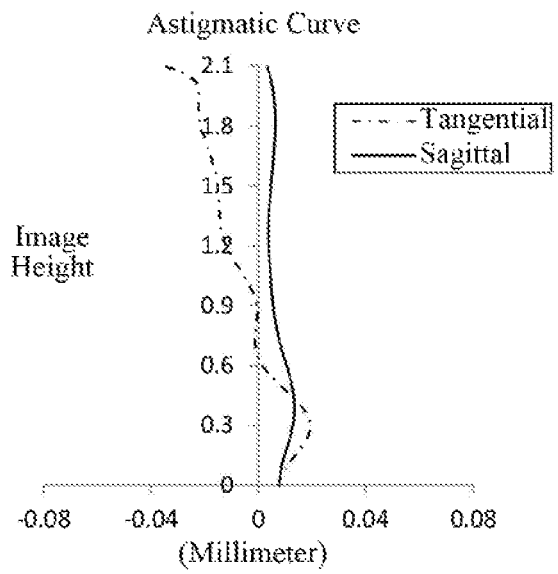
Figure 16C:
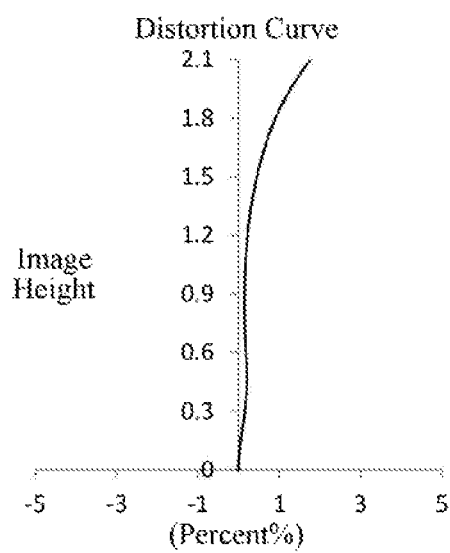
Figure 16D:
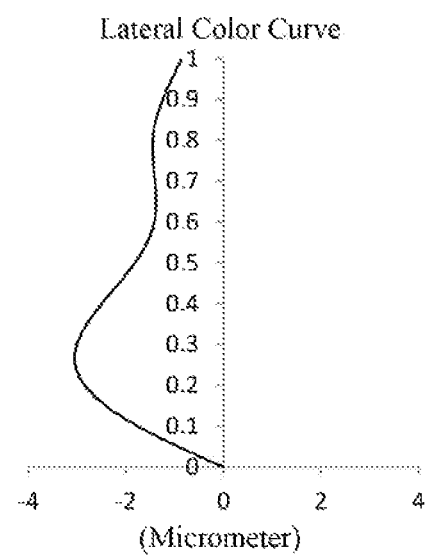

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatic curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion at different image heights. FIG. 16D illustrates a lateral color curve of the optical imaging lens assembly according to embodiment 8, representing deviations of different image heights on an imaging plane after light passes through the optical imaging lens assembly. It can be seen from FIG. 16A to FIG. 16D that the optical imaging lens assembly provided in embodiment 8 can achieve good image quality.

Embodiment 9

An optical imaging lens assembly according to embodiment 9 of the present disclosure is described below with reference to FIG. 17 to FIG. 18D. FIG. 17 is a schematic structural view of the optical imaging lens assembly according to embodiment 9 of the present disclosure.

As shown in FIG. 17, the optical imaging lens assembly according to an exemplary implementation includes, sequentially from an object side to an image side along an optical axis: a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a concave surface. The sixth lens E6 has a negative refractive power, an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the imaging plane S15.

Table 25 shows surface type, radius of curvature, thickness, material and conic coefficient of each lens of the optical imaging lens assembly in embodiment 9, wherein the units for the radius of curvature and the thickness are millimeter (mm). Table 26 shows high-order coefficients applicable to each aspheric surface in embodiment 9, wherein the surface type of each aspheric surface may be defined by the formula (1) given above in embodiment 1. Table 27 shows effective focal lengths f1 to f6 of lenses, the total effective focal length f, a total optical length TTL, and half of a maximal field-of-view angle HFOV of the optical imaging lens assembly in embodiment 9.

TABLE 25

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.1000 | | | |
| S1 | aspheric | 2.1197 | 0.6912 | 1.53 | 56.0 | 0.4536 |
| S2 | aspheric | −107.9792 | 0.2047 | | | 99.0000 |
| S3 | aspheric | 3.8319 | 0.2000 | 1.61 | 26.6 | −19.2386 |
| S4 | aspheric | 1.4262 | 0.1316 | | | −3.7801 |
| S5 | aspheric | 2.0333 | 0.8000 | 1.53 | 56.0 | −2.3934 |
| S6 | aspheric | 5.5172 | 1.3463 | | | −38.9115 |
| S7 | aspheric | −5.3432 | 0.2000 | 1.53 | 56.0 | 6.6275 |
| S8 | aspheric | −1000.0000 | 0.2503 | | | 99.0000 |
| S9 | aspheric | 3.4027 | 0.4481 | 1.61 | 26.6 | −70.7158 |
| S10 | aspheric | 7.4807 | 0.1126 | | | −99.0000 |
| S11 | aspheric | −6.5695 | 0.2000 | 1.53 | 56.0 | 0.5562 |
| S12 | aspheric | 13.7096 | 0.3787 | | | −92.1219 |
| S13 | spherical | infinite | 0.2100 | 1.52 | 64.2 | |
| S14 | spherical | infinite | 0.8266 | | | |
| S15 | spherical | infinite | | | | |

TABLE 26

| Surface number | A4 | A6 | A8 | A10 | A12 | A14 | A16 | A18 | A20 |
|---|---|---|---|---|---|---|---|---|---|
| S1 | −6.2740E−03 | −2.9049E−02 | 1.0051E−01 | −2.2100E−01 | 2.9702E−01 | −2.5047E−01 | 1.2889E−01 | −3.6942E−02 | 4.5238E−03 |
| S2 | −2.4153E−03 | 2.9590E−02 | −1.0640E−01 | 1.6338E−01 | −1.4482E−01 | 7.4027E−02 | −1.6751E−02 | −1.0751E−03 | 8.7701E−04 |
| S3 | −1.0259E−01 | 3.1608E−01 | −9.5870E−01 | 1.8054E+00 | −2.2376E+00 | 1.8494E+00 | −9.7491E−01 | 2.9385E−01 | −3.8265E−02 |
| S4 | −6.5833E−02 | 5.3611E−01 | −1.9478E+00 | 4.3724E+00 | −6.6585E+00 | 6.7852E+00 | −4.3585E+00 | 1.5796E+00 | −2.4483E−01 |
| S5 | −3.2808E−02 | 2.6236E−01 | −9.6395E−01 | 2.3237E+00 | −3.8880E+00 | 4.2661E+00 | −2.8733E+00 | 1.0715E+00 | −1.6887E−01 |
| S6 | −7.9845E−03 | 6.0826E−03 | −1.1227E−01 | 3.5552E−01 | −6.9251E−01 | 8.3408E−01 | −6.0234E−01 | 2.3982E−01 | −4.0459E−02 |
| S7 | 3.6756E−02 | −2.2912E−01 | 4.3409E−01 | −9.1446E−01 | 1.2821E+00 | −1.3079E+00 | 8.5225E−01 | −2.8285E−01 | 3.2211E−02 |
| S8 | 5.2419E−02 | −2.2188E−01 | 5.4607E−01 | −9.6446E−01 | 1.1400E+00 | −9.6093E−01 | 5.4351E−01 | −1.7464E−01 | 2.3303E−02 |
| S9 | 9.9372E−02 | −6.8507E−01 | 1.6339E+00 | −3.0088E+00 | 3.7197E+00 | −2.8442E+00 | 1.2524E+00 | −2.8211E−01 | 2.3845E−02 |
| S10 | −1.9546E−01 | 1.1651E−02 | 1.8003E−01 | −3.3942E−01 | 3.7407E−01 | −2.6609E−01 | 1.1171E−01 | −2.4543E−02 | 2.1622E−03 |
| S11 | −4.1249E−01 | 8.5005E−01 | −7.6322E−01 | 4.0191E−01 | −1.4829E−01 | 4.4046E−02 | −1.0191E−02 | 1.4959E−03 | −9.7780E−05 |
| S12 | −2.8656E−01 | 6.4718E−01 | −7.0668E−01 | 4.5574E−01 | −1.8518E−01 | 4.6294E−02 | −6.4961E−03 | 4.1128E−04 | −4.7988E−06 |

TABLE 27

| | |
|---|---|
| f1 (mm) | 3.90 |
| f2 (mm) | −3.83 |
| f3 (mm) | 5.58 |
| f4 (mm) | −10.06 |
| f5 (mm) | 9.78 |
| f6 (mm) | −8.29 |
| f (mm) | 6.08 |
| TTL (mm) | 6.00 |
| HFOV (°) | 18.9 |

Figure 18C:
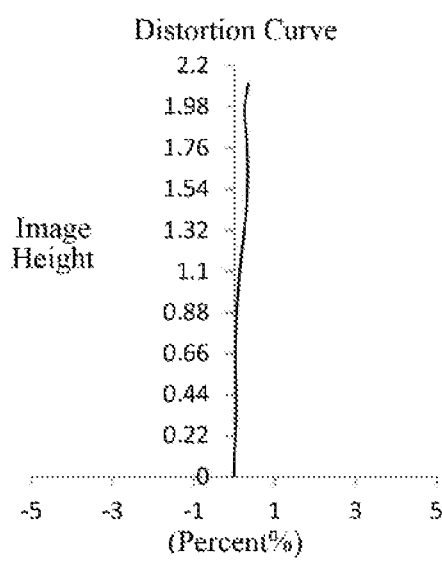
Figure 18D:
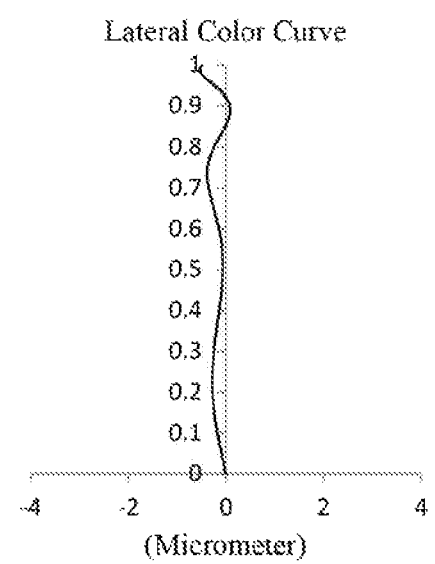

FIG. 18A illustrates a longitudinal aberration curve of the optical imaging lens assembly according to embodiment 9, representing deviations of focal points converged by light of different wavelengths after passing through the optical imaging lens assembly. FIG. 18B illustrates an astigmatic curve of the optical imaging lens assembly according to embodiment 9, representing a curvature of a tangential plane and a curvature of a sagittal plane. FIG. 18C illustrates a distortion curve of the optical imaging lens assembly according to embodiment 9, representing amounts of distortion at different image heights. FIG. 18D illustrates a lateral color curve of the optical imaging lens assembly according to embodiment 9, representing deviations of different image heights on an imaging plane after light passes through the optical imaging lens assembly. It can be seen from FIG. 18A to FIG. 18D that the optical imaging lens assembly provided in embodiment 9 can achieve good image quality.

In view of the above, embodiments 1 to 9 respectively satisfy the relationship shown in Table 28.

TABLE 28

| Formula | Embodiment | | | | | | | | |
|---|---|---|---|---|---|---|---|---|---|
| | 1 | 2 | 3 | 4 | 5 | 6 | 7 | 8 | 9 |
| f*TAN(HFOV) | 1.97 | 1.98 | 1.99 | 1.86 | 1.98 | 1.99 | 1.92 | 2.07 | 2.08 |
| DT11/DT61 | 0.87 | 0.85 | 0.83 | 0.85 | 0.84 | 0.82 | 0.85 | 0.82 | 0.74 |
| TTL/f | 0.97 | 0.99 | 0.99 | 0.99 | 0.99 | 0.99 | 0.99 | 0.97 | 0.99 |
| f1/f | 0.64 | 0.65 | 0.65 | 0.56 | 0.65 | 0.65 | 0.52 | 0.64 | 0.64 |
| \|SAG41/T34\| | 0.35 | 0.36 | 0.35 | 0.33 | 0.36 | 0.35 | 0.34 | 0.28 | 0.35 |
| (R5 + R11)/(R1 + R4) | −0.10 | −0.07 | −0.74 | −0.33 | −0.39 | −0.49 | 0.24 | −0.10 | −1.28 |
| (1/f3 + 1/f6) × f2 | 0.11 | 0.07 | −0.05 | 1.06 | −0.06 | −0.64 | 0.66 | 0.09 | −0.22 |
| (CT2 + CT4)/CT3 | 0.55 | 0.54 | 0.44 | 0.63 | 0.48 | 0.52 | 0.56 | 0.54 | 0.50 |
| \|f/R7-f/R8\| | 2.18 | 2.15 | 0.05 | 2.32 | 0.50 | 2.14 | 2.14 | 2.19 | 1.13 |
| \|f123/f456\| | 0.54 | 0.49 | 0.50 | 0.19 | 0.49 | 0.45 | 0.38 | 0.54 | 0.61 |
| CT1/(T45 + CT5 + T56 + CT6) | 0.88 | 0.86 | 0.92 | 1.27 | 0.90 | 0.94 | 1.15 | 0.86 | 0.68 |
| f1/ΣCT | 1.56 | 1.55 | 1.57 | 1.37 | 1.57 | 1.47 | 1.24 | 1.57 | 1.54 |
| (T23 + T45)/T34 | 0.14 | 0.14 | 0.20 | 0.22 | 0.19 | 0.16 | 0.10 | 0.14 | 0.28 |
| f/f1/TAN(HFOV) | 4.92 | 4.72 | 4.69 | 5.80 | 4.71 | 4.69 | 6.14 | 4.66 | 4.55 |

The present disclosure further provides an imaging apparatus, having an electronic photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side along an optical axis, comprising a first lens, a second lens, a third lens, a fourth lens, a fifth lens and a sixth lens,
   wherein,
   the first lens has a positive refractive power with a convex object-side surface;
   the second lens has a refractive power with a concave image-side surface;
   the third lens has a refractive power with a convex object-side surface;
   the fourth lens has a refractive power with a concave object-side surface;
   the fifth lens has a refractive power; and
   the sixth lens has a refractive power with a concave object-side surface at a paraxial region;
   wherein a number of lenses included in the optical imaging lens assembly is six;
   wherein a total effective focal length f of the optical imaging lens assembly and half of a maximal field-of-view angle HFOV of the optical imaging lens assembly satisfy 1.6<f*TAN(HFOV)<2.4;
   an effective focal length f1 of the first lens and a sum ΣCT of center thicknesses along the optical axis of the first lens to the sixth lens satisfy 1<f1/ΣCT<2;
   a center thickness CT2 along the optical axis of the second lens, a center thickness CT3 along the optical axis of the third lens and a center thickness CT4 along the optical axis of the fourth lens satisfy (CT2+CT4)/CT3<1;
   a maximum effective radius DT11 of the object-side surface of the first lens and a maximum effective radius DT61 of the object-side surface of the sixth lens satisfy 0.6<DT11/DT61<1; and
   a spaced interval T23 along the optical axis between the second lens and the third lens, a spaced interval T34 along the optical axis between the third lens and the fourth lens, a spaced interval T45 along the optical axis between the fourth lens and the fifth lens satisfy (T23+T45)/T34<0.4.

2. The optical imaging lens assembly according to claim 1, wherein the fourth lens has a positive refractive power, and the optical imaging lens assembly satisfies: (T23+T45)/T34≤0.28.

3. The optical imaging lens assembly according to claim 1, wherein a total effective focal length f of the optical imaging lens assembly, an effective focal length f1 of the first lens and half of a maximal field-of-view angle HFOV of the optical imaging lens assembly satisfy 4.5≤f/f1/TAN(HFOV)<6.5.

4. The optical imaging lens assembly according to claim 1, wherein a total effective focal length f of the optical imaging lens assembly and a distance TTL along the optical axis from the object-side surface of the first lens to an imaging plane of the optical imaging lens assembly satisfy TTL/f<1.05.

5. The optical imaging lens assembly according to claim 4, wherein an effective focal length f1 of the first lens and the total focal length f of the optical imaging lens assembly satisfy 0.5<f1/f<1.

6. The optical imaging lens assembly according to claim 4, wherein the total focal length f of the optical imaging lens assembly, a radius of curvature R7 of the object-side surface of the fourth lens and a radius of curvature R8 of an image-side surface of the fourth lens satisfy |f/R7-f/R8|<2.5.

7. The optical imaging lens assembly according to claim 1, wherein 0.5<CT1/(T45+CT5+T56+CT6)<1.5, where CT1 is a center thickness along the optical axis of the first lens, T45 is a spaced interval along the optical axis between the fourth lens and the fifth lens, CT5 is a center thickness along the optical axis of the fifth lens, T56 is a spaced interval along the optical axis between the fifth lens and the sixth lens, and CT6 is a center distance along the optical axis of the sixth lens.

8. The optical imaging lens assembly according to claim 1, wherein a distance SAG41 along the optical axis from an intersection of the object-side surface of the fourth lens and the optical axis to a vertex of an effective radius of the object-side surface of the fourth lens and a spaced distance T34 along the optical axis between the third lens and the fourth lens satisfy |SAG41/T34|<0.5.

9. The optical imaging lens assembly according to claim 1, wherein a radius of curvature R1 of the object-side surface of the first lens, a radius of curvature R4 of the image-side surface of the second lens, a radius of curvature R5 of the object-side surface of the third lens and a radius of curvature R11 of the object-side surface of the sixth lens satisfy -1.5<(R5+R11)/(R1+R4)<0.5.

10. The optical imaging lens assembly according to claim 1, wherein an effective focal length f2 of the second lens, an effective focal length f3 of the third lens and an effective focal length f6 of the sixth lens satisfy -1<(1/f3+1/f6)*f2<1.5.

11. The optical imaging lens assembly according to claim 1, wherein
a combined focal length f123 of the first lens, the second lens and the third lens and a combined focal length f456 of the fourth lens, the fifth lens and the sixth lens satisfy |f123/f456|<1.

12. The optical imaging lens assembly according to claim 11, wherein an effective focal length f1 of the first lens and a total effective focal length f of the optical imaging lens assembly satisfy 0.5<f1/f<1.

13. The optical imaging lens assembly according to claim 11, wherein a total focal length f of the optical imaging lens assembly, a radius of curvature R7 of the object-side surface of the fourth lens and a radius of curvature R8 of an image-side surface of the fourth lens satisfy |f/R7-f/R8|<2.5.

14. The optical imaging lens assembly according to claim 11, wherein an effective focal length f2 of the second lens, an effective focal length f3 of the third lens and an effective focal length f6 of the sixth lens satisfy -1<(1/f3+1/f6)*f2<1.5.

15. The optical imaging lens assembly according to claim 11, wherein an effective focal length f1 of the first lens and a sum ΣCT of center thicknesses along the optical axis of the first lens to the sixth lens satisfy 1<f1/ΣCT<2.

16. The optical imaging lens assembly according to claim 11, wherein a total effective focal length f of the optical imaging lens assembly and half of a maximal field-of-view angle HFOV of the optical imaging lens assembly satisfy 1.6<f*TAN(HFOV)<2.4.

17. The optical imaging lens assembly according to claim 11, wherein a total effective focal length f of the optical imaging lens assembly and a distance TTL along the optical axis from the object-side surface of the first lens to an imaging plane of the optical imaging lens assembly satisfy TTL/f<1.05.

* * * * *